United States Patent
Sheppard et al.

(10) Patent No.: US 12,093,968 B2
(45) Date of Patent: Sep. 17, 2024

(54) METHODS, SYSTEMS AND APPARATUS TO ESTIMATE CENSUS-LEVEL TOTAL IMPRESSION DURATIONS AND AUDIENCE SIZE ACROSS DEMOGRAPHICS

(71) Applicant: The Nielsen Company (US), LLC, New York, NY (US)

(72) Inventors: Michael R. Sheppard, Holland, MI (US); DongBo Cui, New York, NY (US); Jake Dailey, San Francisco, CA (US); Edward Murphy, North Stonington, CT (US); Diane Morovati Lopez, West Hills, CA (US)

(73) Assignee: The Nielsen Company (US), LLC, New York, NY (US)

( * ) Notice: Subject to any disclaimer, the term of this patent is extended or adjusted under 35 U.S.C. 154(b) by 370 days.

(21) Appl. No.: 17/219,548

(22) Filed: Mar. 31, 2021

(65) Prior Publication Data

US 2022/0092613 A1 Mar. 24, 2022

Related U.S. Application Data

(60) Provisional application No. 63/080,516, filed on Sep. 18, 2020.

(51) Int. Cl.
G06Q 30/0201 (2023.01)
G06F 16/9536 (2019.01)
G06F 17/18 (2006.01)

(52) U.S. Cl.
CPC ..... *G06Q 30/0201* (2013.01); *G06F 16/9536* (2019.01); *G06F 17/18* (2013.01)

(58) Field of Classification Search
None
See application file for complete search history.

(56) References Cited

U.S. PATENT DOCUMENTS

| | | | |
|---|---|---|---|
| 610,637 | A | 9/1898 | Powell |
| 3,070,139 | A | 12/1962 | Witschi et al. |

(Continued)

FOREIGN PATENT DOCUMENTS

| | | |
|---|---|---|
| JP | 2015529870 A | 10/2015 |
| JP | 2015529970 A | 10/2015 |

(Continued)

OTHER PUBLICATIONS

Xie et al., Estimating Online User Location Distribution without GPS Location (Year: 2014).*

(Continued)

*Primary Examiner* — Mohamed N El-Bathy

(57) ABSTRACT

Example technical solutions to determine census-level audience metrics across demographics are disclosed. Disclosed example apparatus include a distribution parameter solver to initialize distribution parameter values for a probability of an individual within a demographic being (i) included in a subscriber audience for the demographic and (ii) having a first impression duration, the subscriber audience having a first subscriber audience size. Disclosed example apparatus also include a divergence parameter solver to determine divergence parameter values between (i) the first subscriber audience size and the first impression duration and (ii) a census-level audience size and a second impression duration based on the initialized distribution parameter values. Disclosed example apparatus further include a search space identifier to identify a search space within bounds based on a census-level total impression count and a census-level total impression duration, the search space to define a range based on census-level duration equality and census-level audience equality constraints.

20 Claims, 9 Drawing Sheets

(56) References Cited

U.S. PATENT DOCUMENTS

| | | | |
|---|---|---|---|
| 5,956,692 A | 9/1999 | Foley | |
| 6,029,045 A | 2/2000 | Picco et al. | |
| 6,108,637 A | 8/2000 | Blumenau | |
| 6,460,025 B1 | 10/2002 | Fohn et al. | |
| 6,775,663 B1 | 8/2004 | Kim | |
| 7,043,433 B2 | 5/2006 | Hejna, Jr. | |
| 7,197,472 B2 | 3/2007 | Conkwright et al. | |
| 7,746,272 B2 | 6/2010 | Vollath | |
| 7,865,916 B2 | 1/2011 | Beser et al. | |
| 7,954,120 B2 | 5/2011 | Roberts et al. | |
| 8,087,041 B2 | 12/2011 | Fu et al. | |
| 8,112,301 B2 | 2/2012 | Harvey et al. | |
| 8,149,162 B1 | 4/2012 | Pauls | |
| 8,169,892 B2 | 5/2012 | Malkamaki et al. | |
| 8,171,032 B2 | 5/2012 | Herz | |
| 8,185,456 B2 | 5/2012 | LeClair et al. | |
| 8,200,693 B2 | 6/2012 | Steele et al. | |
| 8,214,518 B1 | 7/2012 | Bertz | |
| 8,370,489 B2 | 2/2013 | Mazumdar et al. | |
| 8,423,406 B2 | 4/2013 | Briggs | |
| 8,453,173 B1 | 5/2013 | Anderson et al. | |
| 8,572,019 B2 | 10/2013 | Eggers et al. | |
| 8,619,652 B2 | 12/2013 | Singh et al. | |
| 8,619,892 B2 | 12/2013 | Vetter et al. | |
| 8,660,895 B1 | 2/2014 | Saurabh et al. | |
| 8,874,652 B1 | 10/2014 | Pecjak et al. | |
| 8,904,149 B2 | 12/2014 | Eren et al. | |
| 8,913,023 B2 | 12/2014 | Li et al. | |
| 8,930,701 B2 | 1/2015 | Burbank et al. | |
| 8,973,023 B1 | 3/2015 | Rao et al. | |
| 8,973,123 B2 | 3/2015 | Bjones et al. | |
| 9,070,139 B2 | 6/2015 | Zhang | |
| 9,094,710 B2 | 7/2015 | Lee et al. | |
| 9,111,186 B2 | 8/2015 | Blasinski et al. | |
| 9,224,094 B2 | 12/2015 | Oliver et al. | |
| 9,236,962 B2 | 1/2016 | Hawkins et al. | |
| 9,237,138 B2 | 1/2016 | Bosworth et al. | |
| 9,420,320 B2 | 8/2016 | Doe | |
| 9,467,745 B1 | 10/2016 | Hotchkiss et al. | |
| 9,529,836 B1 | 12/2016 | Hale | |
| 9,870,486 B2 | 1/2018 | Sullivan et al. | |
| 9,979,614 B2 | 5/2018 | Kalus et al. | |
| 10,045,057 B2 | 8/2018 | Shah et al. | |
| 10,070,166 B2 | 9/2018 | Chaar et al. | |
| 10,115,434 B2 | 10/2018 | Leppänen et al. | |
| 10,237,419 B2 | 3/2019 | Shah et al. | |
| 10,309,451 B2 | 6/2019 | Yoshino et al. | |
| 10,313,752 B2 | 6/2019 | Nagaraja Rao et al. | |
| 10,380,633 B2 | 8/2019 | Morovati et al. | |
| 10,382,318 B2 | 8/2019 | Hong et al. | |
| 10,382,818 B2 | 8/2019 | Sheppard et al. | |
| 10,425,458 B2 | 9/2019 | Salgueiro et al. | |
| 10,491,696 B2 | 11/2019 | Gierada | |
| 10,536,358 B2 | 1/2020 | Sheppard | |
| 10,602,224 B2 | 3/2020 | Sullivan et al. | |
| 10,609,451 B2 | 3/2020 | de Andrade et al. | |
| 10,681,414 B2 | 6/2020 | Sheppard et al. | |
| 10,728,614 B2 | 7/2020 | Sheppard et al. | |
| 10,743,064 B2 | 8/2020 | Berezowski et al. | |
| 10,803,475 B2 | 10/2020 | Rao et al. | |
| 10,856,027 B2 | 12/2020 | Sheppard et al. | |
| 10,958,956 B2 | 3/2021 | Ricci | |
| 11,039,190 B1 | 6/2021 | Dailey et al. | |
| 11,115,710 B2 | 9/2021 | Sheppard et al. | |
| 11,140,449 B2 | 10/2021 | Sullivan et al. | |
| 11,216,834 B2 | 1/2022 | Sheppard et al. | |
| 11,308,514 B2 | 4/2022 | Sheppard et al. | |
| 11,323,772 B2 | 5/2022 | Sheppard et al. | |
| 11,425,458 B2 | 8/2022 | Sheppard et al. | |
| 11,438,662 B2 | 9/2022 | Sullivan et al. | |
| 11,481,802 B2 | 10/2022 | Sheppard et al. | |
| 11,483,606 B2 | 10/2022 | Sheppard et al. | |
| 11,523,177 B2 | 12/2022 | Sheppard et al. | |
| 11,553,226 B2 | 1/2023 | Sheppard et al. | |
| 11,689,767 B2 | 6/2023 | Sheppard et al. | |
| 2002/0123928 A1 | 9/2002 | Eldering et al. | |
| 2003/0037041 A1 | 2/2003 | Hertz | |
| 2004/0001538 A1 | 1/2004 | Garrett | |
| 2004/0059549 A1 | 3/2004 | Kropaczek et al. | |
| 2005/0071218 A1 | 3/2005 | Lin et al. | |
| 2006/0190318 A1 | 8/2006 | Downey et al. | |
| 2007/0028006 A1 | 2/2007 | Laefer et al. | |
| 2007/0033074 A1 | 2/2007 | Nitzan et al. | |
| 2007/0087756 A1 | 4/2007 | Hoffberg | |
| 2007/0282785 A1* | 12/2007 | Fayyad | G06Q 30/0244 |
| 2008/0004958 A1 | 1/2008 | Ralph et al. | |
| 2008/0028006 A1 | 1/2008 | Liu et al. | |
| 2008/0228543 A1 | 9/2008 | Doe | |
| 2008/0300965 A1 | 12/2008 | Doe | |
| 2008/0301746 A1 | 12/2008 | Wiser et al. | |
| 2008/0313017 A1 | 12/2008 | Totten | |
| 2009/0265215 A1 | 10/2009 | Lindstrom | |
| 2010/0185516 A1 | 7/2010 | Swanson et al. | |
| 2010/0191723 A1 | 7/2010 | Perez et al. | |
| 2010/0318413 A1 | 12/2010 | Zinkevich et al. | |
| 2011/0015992 A1 | 1/2011 | Liffiton et al. | |
| 2011/0196733 A1 | 8/2011 | Li et al. | |
| 2012/0023522 A1 | 1/2012 | Anderson et al. | |
| 2012/0025930 A1 | 2/2012 | Gilliland et al. | |
| 2012/0052930 A1 | 3/2012 | McGucken | |
| 2012/0066410 A1 | 3/2012 | Stefanakis et al. | |
| 2012/0072940 A1 | 3/2012 | Fuhrer | |
| 2012/0110027 A1 | 5/2012 | Falcon | |
| 2012/0254911 A1 | 10/2012 | Doe | |
| 2012/0254922 A1 | 10/2012 | Rangarajan et al. | |
| 2013/0097312 A1* | 4/2013 | Mazumdar | G06F 16/951 709/224 |
| 2013/0138743 A1 | 5/2013 | Amento et al. | |
| 2013/0165277 A1 | 6/2013 | Wang | |
| 2013/0198125 A1 | 8/2013 | Oliver et al. | |
| 2013/0226655 A1 | 8/2013 | Shaw | |
| 2013/0254787 A1 | 9/2013 | Cox et al. | |
| 2013/0268351 A1* | 10/2013 | Abraham | G06Q 30/0241 705/14.45 |
| 2013/0290233 A1 | 10/2013 | Ferren et al. | |
| 2013/0339991 A1 | 12/2013 | Ricci | |
| 2013/0346033 A1 | 12/2013 | Wang et al. | |
| 2014/0101685 A1 | 4/2014 | Kitts et al. | |
| 2014/0112557 A1 | 4/2014 | Santamaria-Pang et al. | |
| 2014/0278933 A1 | 9/2014 | McMillan | |
| 2014/0280891 A1 | 9/2014 | Doe | |
| 2014/0337104 A1 | 11/2014 | Splaine et al. | |
| 2014/0358676 A1 | 12/2014 | Srivastava et al. | |
| 2015/0032310 A1 | 1/2015 | Zettel et al. | |
| 2015/0095138 A1* | 4/2015 | Rao | H04N 21/44226 705/14.41 |
| 2015/0179953 A1 | 6/2015 | Mujica-Fernaud et al. | |
| 2015/0180989 A1 | 6/2015 | Seth | |
| 2015/0184652 A1 | 7/2015 | Murakami | |
| 2015/0186403 A1 | 7/2015 | Srivastava et al. | |
| 2015/0189500 A1 | 7/2015 | Bosworth et al. | |
| 2015/0193816 A1 | 7/2015 | Toupet et al. | |
| 2015/0244820 A1* | 8/2015 | Verkasalo | G06F 16/958 707/740 |
| 2015/0262207 A1 | 9/2015 | Rao et al. | |
| 2015/0324837 A1 | 11/2015 | Shimizu et al. | |
| 2015/0332310 A1 | 11/2015 | Cui et al. | |
| 2015/0332317 A1 | 11/2015 | Cui et al. | |
| 2016/0012314 A1 | 1/2016 | Ramamurthy et al. | |
| 2016/0086208 A1 | 3/2016 | Oliver et al. | |
| 2016/0132940 A1 | 5/2016 | Frommann et al. | |
| 2016/0134934 A1 | 5/2016 | Jared et al. | |
| 2016/0162955 A1 | 6/2016 | O'Kelley et al. | |
| 2016/0165277 A1 | 6/2016 | Kirillov et al. | |
| 2016/0232563 A1 | 8/2016 | Perez et al. | |
| 2016/0233563 A1 | 8/2016 | Oshima et al. | |
| 2016/0249098 A1 | 8/2016 | Pecjak et al. | |
| 2016/0269783 A1 | 9/2016 | Mowrer et al. | |
| 2016/0323616 A1 | 11/2016 | Doe | |
| 2016/0373820 A1 | 12/2016 | Meyer et al. | |
| 2016/0379246 A1* | 12/2016 | Sheppard | G06Q 30/0246 705/14.45 |
| 2017/0004526 A1* | 1/2017 | Morovati | H04N 21/6582 |
| 2017/0006342 A1 | 1/2017 | Nagaraja Rao et al. | |

(56) References Cited

U.S. PATENT DOCUMENTS

| | | |
|---|---|---|
| 2017/0034594 A1 | 2/2017 | Francis et al. |
| 2017/0053306 A1 | 2/2017 | Sissenich et al. |
| 2017/0061470 A1 | 3/2017 | Sheppard et al. |
| 2017/0155956 A1 | 6/2017 | Nagaraja Rao et al. |
| 2017/0171580 A1 | 6/2017 | Hirsch et al. |
| 2017/0213243 A1 | 7/2017 | Dollard |
| 2017/0251253 A1* | 8/2017 | Sheppard ......... H04N 21/44218 |
| 2017/0300911 A1 | 10/2017 | Alnajem |
| 2018/0073933 A1 | 3/2018 | Keskin et al. |
| 2018/0167675 A1* | 6/2018 | Doe ................ H04N 21/25841 |
| 2018/0189950 A1 | 7/2018 | Norouzi et al. |
| 2018/0198543 A1 | 7/2018 | Perrin et al. |
| 2018/0225709 A1 | 8/2018 | Ferber et al. |
| 2018/0240042 A1 | 8/2018 | Boada et al. |
| 2018/0249208 A1 | 8/2018 | Sheppard et al. |
| 2018/0249210 A1 | 8/2018 | Sheppard et al. |
| 2018/0249211 A1 | 8/2018 | Sheppard et al. |
| 2018/0249214 A1 | 8/2018 | Sullivan et al. |
| 2018/0315060 A1 | 11/2018 | Sheppard et al. |
| 2018/0332177 A1 | 11/2018 | Shah et al. |
| 2018/0367198 A1 | 12/2018 | Jian |
| 2018/0376198 A1 | 12/2018 | Sheppard et al. |
| 2019/0057403 A1 | 2/2019 | Sheppard et al. |
| 2019/0147461 A1 | 5/2019 | Sheppard et al. |
| 2019/0245760 A1 | 8/2019 | Sheppard et al. |
| 2019/0289363 A1 | 9/2019 | Nagaraja Rao et al. |
| 2019/0304205 A1 | 10/2019 | Sheppard et al. |
| 2019/0354574 A1 | 11/2019 | Wick et al. |
| 2019/0356950 A1 | 11/2019 | Sheppard et al. |
| 2019/0370860 A1 | 12/2019 | Morovati Lopez et al. |
| 2020/0007919 A1 | 1/2020 | Sheppard et al. |
| 2020/0014564 A1 | 1/2020 | Li et al. |
| 2020/0120387 A1 | 4/2020 | Sheppard et al. |
| 2020/0145720 A1 | 5/2020 | Krauss et al. |
| 2020/0175546 A1 | 6/2020 | Perez et al. |
| 2020/0204863 A1 | 6/2020 | Sullivan et al. |
| 2020/0228427 A1 | 7/2020 | Sheppard et al. |
| 2020/0294069 A1 | 9/2020 | Sheppard et al. |
| 2020/0296441 A1 | 9/2020 | Sheppard et al. |
| 2020/0359090 A1 | 11/2020 | Sheppard et al. |
| 2020/0413124 A1* | 12/2020 | Patten ................ H04N 21/2668 |
| 2021/0014564 A1 | 1/2021 | Sheppard et al. |
| 2021/0058659 A1 | 2/2021 | Sheppard et al. |
| 2021/0065230 A1 | 3/2021 | Flynn |
| 2021/0065231 A1 | 3/2021 | Sheppard et al. |
| 2021/0084370 A1 | 3/2021 | Doe |
| 2021/0133773 A1 | 5/2021 | Sheppard et al. |
| 2021/0158376 A1 | 5/2021 | Sheppard et al. |
| 2021/0158377 A1 | 5/2021 | Sheppard et al. |
| 2021/0158391 A1 | 5/2021 | Sheppard et al. |
| 2021/0203563 A1* | 7/2021 | George ................ G06N 5/045 |
| 2021/0248629 A1 | 8/2021 | Sullivan et al. |
| 2021/0303552 A1 | 9/2021 | Pandey et al. |
| 2021/0319002 A1 | 10/2021 | Ryan et al. |
| 2021/0319474 A1 | 10/2021 | Sheppard et al. |
| 2021/0400341 A1 | 12/2021 | Sheppard et al. |
| 2021/0406343 A1 | 12/2021 | Sabra et al. |
| 2022/0036390 A1 | 2/2022 | Sheppard et al. |
| 2022/0038781 A1 | 2/2022 | Sullivan et al. |
| 2022/0058662 A1 | 2/2022 | Sheppard et al. |
| 2022/0058664 A1 | 2/2022 | Sheppard et al. |
| 2022/0058667 A1 | 2/2022 | Sheppard et al. |
| 2022/0058688 A1 | 2/2022 | Sheppard et al. |
| 2022/0122104 A1 | 4/2022 | Sheppard et al. |
| 2022/0159326 A1 | 5/2022 | Sheppard et al. |
| 2022/0253895 A1 | 8/2022 | Sheppard et al. |
| 2022/0264179 A1 | 8/2022 | Sheppard et al. |
| 2022/0264187 A1 | 8/2022 | Sheppard et al. |
| 2022/0408154 A1 | 12/2022 | Sheppard et al. |
| 2023/0042879 A1 | 2/2023 | Sheppard et al. |
| 2023/0070980 A1 | 3/2023 | Sullivan et al. |
| 2023/0105467 A1 | 4/2023 | Sheppard et al. |
| 2023/0111617 A1 | 4/2023 | Sheppard et al. |

FOREIGN PATENT DOCUMENTS

| | | | |
|---|---|---|---|
| KR | 20160087263 A | 7/2016 | |
| KR | 101934841 B1 | 1/2019 | |
| WO | 0189216 A1 | 11/2001 | |
| WO | 2007007693 A1 | 1/2007 | |
| WO | 2008127737 A1 | 10/2008 | |
| WO | 2014210597 A1 | 12/2014 | |
| WO | 2017054051 A1 | 4/2017 | |
| WO | WO-2019053450 A2 * | 3/2019 | ............ H04H 20/38 |
| WO | 2020190650 A1 | 9/2020 | |

OTHER PUBLICATIONS

Kitts et al., A Comparison of Algorithms for TV Ad Targeting (Year: 2014).*

Alvarez et al., Audience Measurement Modeling for Convergent Broadcasting and IPTV Networks (Year: 2009).*

"Entropy (information theory)," Wikipedia, Page last edited Dec. 23, 2019, Accessed Jan. 2, 2020, Retrieved from the Internet: <URL: https://en.wikipedia.org/wiki/Entropy_(information_theory)> 18 pages.

"Kullback—Leibler Divergence," Wikipedia, Page last edited Dec. 13, 2019, Accessed Jan. 2, 2020, Retrieved from the Internet: <https://en_wikipedia_org/wiki/Kullback%E2%80%93Leibler_divergence>, 15 pages.

"Principle of Maximum Entropy", Wikipedia, Page last edited Nov. 8, 2019, Accessed Jan. 2, 2020, Retrieved from the Internet: <URL: https://en.wikipedia.org/wiki/Principle_of_maximum_entropy> 11 pages.

"A Mathematical Theory of Communication," Wikipedia, Page last edited Sep. 27, 2019, Accessed Jan. 2, 2020, Retrieved from the Internet: <URL: https://en.wikipedia.org/wiki/A_Mathematical_Theory_of Communication> 2 pages.

Araujo et al. Characterizing videos, audience and advertising in Youtube channels for kids, arXiv:1707.00971v1 [cs.CY], Jul. 4, 2017, 11 pages.

Bourguignon et al. "On the Construction of Synthetic Panels," Oct. 2015, 42 pages.

Buzzard, "The Definition of the Audience in the History of Television Audience Research," University Microfilms International, 1985, 483 pages.

Charles L. Byrne, "Applied Iterative Methods," Jan. 23, 2007, 396 pages.

Charles L. Byrne, "Iterative Algorithms in Inverse Problems," Apr. 25, 2006, 347 pages.

Coffey, Steve, "Internet Audience Measurement: A Practitioner's View," Journal of Interactive Advertising, vol. 1 'No. 2 (Spring 2001), 8 pages.

Dai, Wenyuan, et al., "Transferring Naive Bayes Classifiers for Text Classification," Department of Computer Science and Engineering, Shanghai Jiao Tong University, Shanghai, China, Proceedings of the 22nd National conference on Artificial Intelligence, vol. 1, Jul. 22, 2007, 6 pages.

Esch et al., "Appendix 8 Numerical Methods for Solving Nonlinear Equations," Asset and Risk Management: Risk Oriented Finance, published 2005 by John Wiley & Sons Ltd., 7 pages.

Extended European Search Report received in European Application No. 20894507.1, mailed on Oct. 10, 2023, 8 pages.

Extended European Search Report received in European Application No. 20894628.5, mailed on Oct. 12, 2023, 8 pages.

Golub et al., "Linear Least Squares and Quadratic Programming," Technical Report No. CS 134, Stanford University, Computer Science Department, May 1969, 38 pages.

Haggin et al., "Google Nears a Long-Tipped Limit on Tracking 'Cookies,' in Blow to Rivals," Wall Si Journal, May 6, 2019, obtained from https://www.wsj.com/articles/googles-newprivacy-tools-to-make-cookies-crumble-competitors-stumble-11557151913, 3 pages.

Huckett et al., "Combining Methods to Create Synthetic Microdata: Quantile Regression, Hot Deck, and Rank Swapping," Research Gate, Apr. 2008, 11 pages.

(56) References Cited

OTHER PUBLICATIONS

International Preliminary Report on Patentability, issued in connection with International Application No. PCT/US2020/062079, mailed on May 17, 2022, 5 pages.

International Search Report and Written Opinion, issued in connection with International Patent Application No. PCT/US2020/062072, mailed on Mar. 24, 2021, 7 pages.

Seaver, Nick "Computing Taste," University of Chicago Press, 2022, 220 pages.

International Searching Authority, International Preliminary Report on Patentability, issued in connection with International Application No. PCT/US2020/062072, mailed on Mar. 19, 2021, 4 pages.

International Searching Authority, International Search Report and Written Opinion, issued in connection with International Application No. PCT/US2020/062079, mailed on Mar. 24, 2021, 7 pages.

Jaynes, E. T., "Information Theory and Statistical Mechanics," The Physical Review, vol. 106, No. 4, pp. 620-630, May 15, 1957, 11 pages.

Jaynes, E.T., "Probability Theory: The Logic of Science. Cambridge University Press," (2003), Retrieved from the Internet: <URL: http://www.med.mcgill.ca/epidemiology/hanley/bios601/GaussianModel/JaynesProbabilityTheory.pdf> 758 pages.

Kapur, J.N., and Kesavan, H.K., "Entropy Optimization Principles and Their Applications," in: Singh V.P., Fiorentino M (eds) Entropy and Energy Dissipation in Water Resources, Water Science and Technology Library, vol. 9., pp. 3-20, Springer, Dordrecht, (1992), 18 pages.

Kapur, J.N., and Kesavan, H.K., "Entropy Optimization Principles with Applications," Academic Press, San Diego, CA, 1992, pp. 52-55, 76-97, 307-329, 346-351, 388-395, and 401-405, 37 pages.

Kitts et al., "A Comparison of Algorithms for TV Ad Targeting," 2014 IEEE International Conference on Data Mining Workshop, pp. 296-305, Dec. 1, 2014, 3 pages.

Koehler et al., "A Method for Measuring Online Audiences," 2013, Google, Inc., 24 pages.

Kullback, S., and Leibler, R.A., "On Information and Sufficiency," The Annals of Mathematical Statistics, vol. 22, No. 1, pp. 79-86, 1951, 8 pages.

Lee et al., The Effect of Social Media Marketing Content on Consumer Engagement: Evidence from Facebook, https://rnackinstitute.wharton.upenn.edu/wp-content/uploads/2015/01/FP0170 Hosanagar-Kartik.pdf, Research Papers 3087, Stanford University, Graduate School of Business. (Year: 2014).

Marno Verbeek, "Pseudo-Panels and Repeated Cross-Sections," The Econometrics of Panel Data, Springer-Verlag Berlin Heidelberg 2008, 15 pages.

Maximum Entropy Probability Distribution, Wikipedia, Page last edited Nov. 11, 2019, Accessed Jan. 2, 2020, Retrieved from the Internet: <URL: hllps://en.wikipedia.org/wiki/Maximum_ entropy probability iistribution#Discrete_diskibutions_with_specified_mean>, 10 pages.

P.J.G. Teunissen, Least-Squares Estimation of the Integer GPS Ambiguities, Delft University of Technology, Department of the Geodetic Engineering, Aug. 1993, 16 pages.

Samantha Braverman, Are the Online Marketing Efforts of TV Shows and Programs Worthwhile? Mar. 30, 2011, 9 pages.

Sanchez et al., ZSim: Fast and Accurate Microarchitectural Simulation of Thousand-Core Systems, ACM SIGARCH Computer Architecture News, Jun. 2013, 12 pages.

Shannon, C. E., A Mathematical Theory of Communication, The Bell System Technical Journal, vol. 27, No. 3, pp. 379-423, 623-656, July, Oct. 1948, 55 pages.

Trzcinski, Tomasz, "Analyse, Target & Advertise Privacy in mobile ads," Laboratory for Computer communications and Applications, EPFL, Lausanne, Switzerland, Jan. 17, 2011, 8 pages.

United States Patent and Trademark Office, "Advisory Action," issued in connection with U.S. Appl. No. 16/698,147, mailed on Feb. 8, 2023, 6 pages.

United States Patent and Trademark Office, "Final Office Action", issued in connection with U.S. Appl. No. 16/698,147, mailed Oct. 27, 2021, 20 pages.

United States Patent and Trademark Office, "Final Office Action", issued in connection with U.S. Appl. No. 16/698,147, mailed Sep. 9, 2022, 22 pages.

United States Patent and Trademark Office, "Non-Final Office Action", issued in connection with U.S. Appl. No. 16/698,147, mailed Feb. 23, 2022, 21 pages.

United States Patent and Trademark Office, "Non-Final Office Action," issued in connection with U.S. Appl. No. 16/698,147, mailed on Mar. 4, 2021, 20 pages.

United States Patent and Trademark Office, "Non-Final Rejection," issued in connection with U.S. Appl. No. 16/698,147, mailed on Mar. 20, 2023, 13 pages.

United States Patent and Trademark Office, "Non-Final Rejection," issued in connection with U.S. Appl. No. 17/406,886, mailed on Nov. 29, 2023, 22 pages.

United States Patent and Trademark Office, Final Office Action, issued in connection with U.S. Appl. No. 16/698,180, mailed on Dec. 30, 2022, 12 pages.

United States Patent and Trademark Office, Final Office Action, issued in connection with U.S. Appl. No. 16/698,180, mailed on Mar. 1, 2022, 23 pages.

United States Patent and Trademark Office, Non-Final Office Action, issued in connection with U.S. Appl. No. 17/408,164, dated Mar. 29, 2023, 14 pages.

United States Patent and Trademark Office, Non-Final Office Action, issued in connection with U.S. Appl. No. 16/698,180, mailed on Aug. 18, 2021, 19 pages.

United States Patent and Trademark Office, Non-Final Office Action, issued in connection with U.S. Appl. No. 16/698,180, mailed on Jun. 22, 2023, 13 pages.

United States Patent and Trademark Office, Non-Final Office Action, issued in connection with U.S. Appl. No. 16/698,180, mailed on Jun. 24, 2022, 15 pages.

United States Patent and Trademark Office, "Final Office Action," issued in connection with U.S. Appl. No. 16/698,147, mailed on Sep. 27, 2023, 14 pages.

United States Patent and Trademark Office, Final Office Action, issued in connection with U.S. Appl. No. 17/408,164, dated Dec. 8, 2023, 17 pages.

United States Patent and Trademark Office, Non-Final Office Action, issued in connection with U.S. Appl. No. 17/526,450, dated Oct. 30, 2023, 55 pages.

United States Patent and Trademark Office, Non-Final Office Action, issued in connection with U.S. Appl. No. 17/948,873, dated Nov. 16, 2023, 7 pages.

United States Patent and Trademark Office, "Non-Final Rejection," issued in connection with U.S. Appl. No. 16/698,147, dated Apr. 25, 2024, 16 pages.

\* cited by examiner

700↙

| 702 | 704 | 706 Third-Party | | 708 Census | |
|---|---|---|---|---|---|
| Demo | Population | Audience | Duration | Audience | Duration |
| 1 | $U_1$ | $A_1$ | $D_1$ | $X_1$ | $V_1$ |
| 2 | $U_2$ | $A_2$ | $D_2$ | $X_2$ | $V_2$ |
| ⋮ | ⋮ | ⋮ | ⋮ | ⋮ | ⋮ |
| k | $U_k$ | $A_k$ | $D_k$ | $X_k$ | $V_k$ |
| ⋮ | ⋮ | ⋮ | ⋮ | ⋮ | ⋮ |
| Total | $U$ | $A$ | $D$ | $X$ | $V$ |

| 722 | 724 | 726 Third-Party | | 728 Census | |
|---|---|---|---|---|---|
| Demo | Population | Audience | Duration | Audience | Duration |
| < 18 | 1,000 | 500 | 600 | $X_1$ | $V_1$ |
| 18-34 | 10,000 | 2,000 | 3,600 | $X_2$ | $V_2$ |
| 35-44 | 5,000 | 3,000 | 3,600 | $X_3$ | $V_3$ |
| 55+ | 5,000 | 1,000 | 900 | $X_4$ | $V_4$ |
| Total | 21,000 | 6,500 | 8,700 | $X$ | 17,400 |

| | | Third-Party | | 730 Census | |
|---|---|---|---|---|---|
| Demo | Population | Audience | Duration | Audience | Duration |
| < 18 | 1,000 | 500 | 600 | 582 | 972 |
| 18-34 | 10,000 | 2,000 | 3,600 | 3,020 | 9,409 |
| 35-44 | 5,000 | 3,000 | 3,600 | 3,381 | 5,646 |
| 55+ | 5,000 | 1,000 | 900 | 1,203 | 1,373 |
| Total | 21,000 | 6,500 | 8,700 | 8,186 | 17,400 |

| | | Third-Party | | Census | |
|---|---|---|---|---|---|
| Demo | Population | Audience | Duration | Audience | Duration |
| < 18 | 1,000 | 500 | 600 | $X_1$ | $V_1$ |
| 18-34 | 10,000 | 2,000 | 3,600 | $X_2$ | $V_2$ |
| 35-44 | 5,000 | 3,000 | 3,600 | $X_3$ | $V_3$ |
| 55+ | 5,000 | 1,000 | 900 | $X_4$ | $V_4$ |
| Total | 21,000 | 6,500 | 8,700 | 13,000 | 17,400 |

| | | Third-Party | | Census | |
|---|---|---|---|---|---|
| Demo | Population | Audience | Duration | Audience | Duration |
| < 18 | 1,000 | 500 | 600 | 815 | 954 |
| 18-34 | 10,000 | 2,000 | 3,600 | 5,212 | 9,040 |
| 35-44 | 5,000 | 3,000 | 3,600 | 4,343 | 5,084 |
| 55+ | 5,000 | 1,000 | 900 | 2,629 | 2,322 |
| Total | 21,000 | 6,500 | 8,700 | 13,000 | 17,400 |

FIG. 7C

METHODS, SYSTEMS AND APPARATUS TO ESTIMATE CENSUS-LEVEL TOTAL IMPRESSION DURATIONS AND AUDIENCE SIZE ACROSS DEMOGRAPHICS

RELATED APPLICATIONS

This patent claims the benefit of U.S. Provisional Patent Application No. 63/080,516, filed on Sep. 18, 2020. Priority to U.S. Provisional Patent Application No. 63/080,516 is claimed. U.S. Provisional Patent Application No. 63/080,516 is hereby incorporated herein by reference in its entirety.

FIELD OF THE DISCLOSURE

This disclosure relates generally to computer processing, and, more particularly, to methods, systems, and apparatus to estimate census-level total impression durations and audience size across demographics.

BACKGROUND

Media content is accessible to users through a variety of platforms. For example, media content can be viewed on television sets, via the Internet, on mobile devices, in-home or out-of-home, live or time-shifted, etc. Understanding consumer-based engagement with media within and across a variety of platforms (e.g., television, online, mobile, and emerging) allows content providers and website developers to increase user engagement with their media content.

BRIEF DESCRIPTION OF THE DRAWINGS

FIGS. 7A-7C illustrate example data sets providing third-party subscriber and census-level data, including total duration and/or total audience size data used by the example audience metrics estimator of FIGS. 1-2 to generate census-level estimations of unique audience and total impression durations across demographics.

Figure 1:
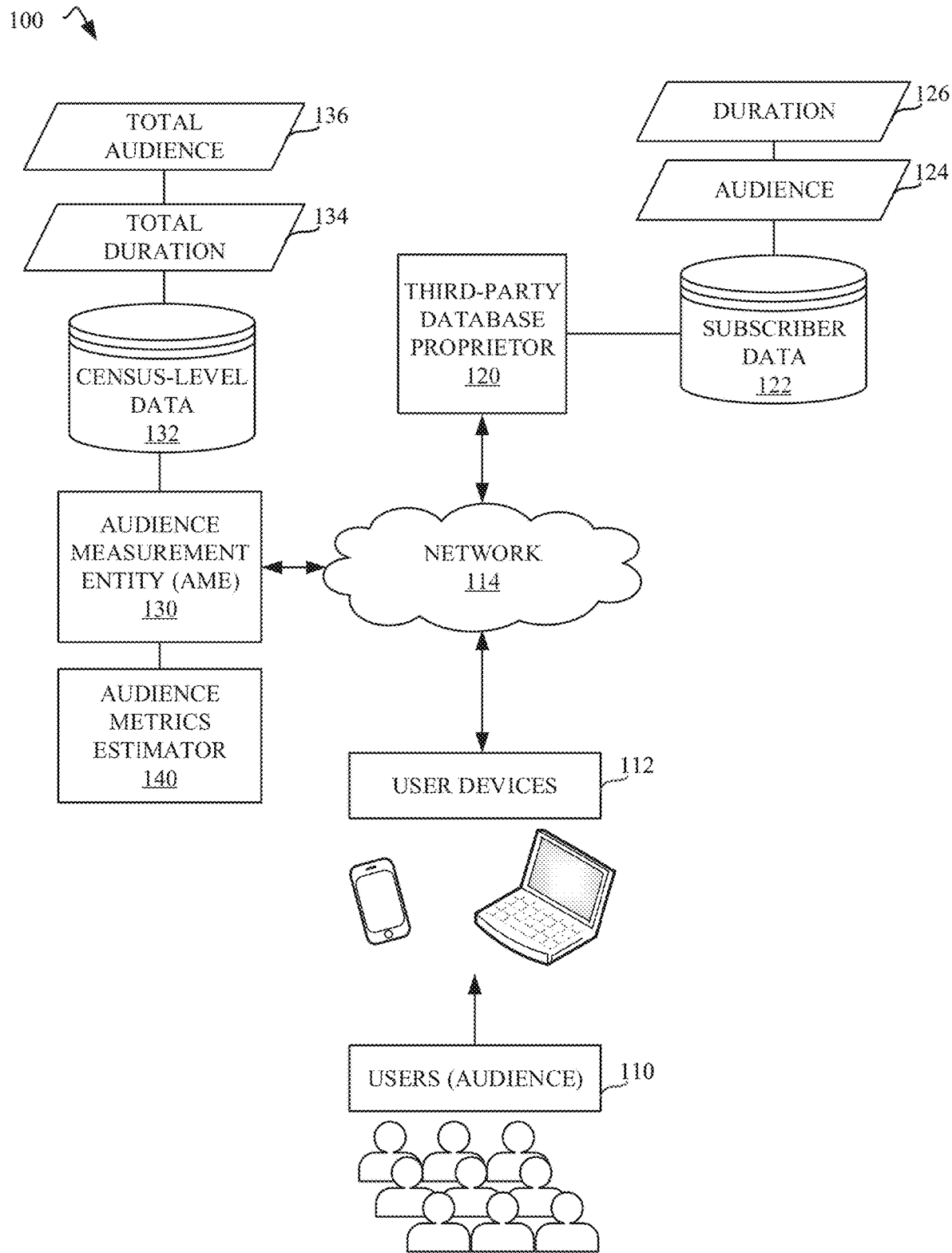
FIG. 1 is a block diagram illustrating an example operating environment, constructed in accordance with teachings of this disclosure, in which an audience metrics estimator is implemented to determine census-level audience and durations across demographics.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience measurement entities (AMEs) perform measurements to determine the number of people (e.g., an audience) who engage in viewing television, listening to radio stations, or browsing websites. Given that companies and/or individuals producing content and/or advertisements want to understand the reach and effectiveness of their content, it is useful to identify such information. To achieve this, companies such as The Nielsen Company, LLC (US), LLC utilize on-device meters (ODMS) to monitor usage of cellphones, tablets (e.g., iPads™) and/or other computing devices (e.g., PDAs, laptop computers, etc.) of individuals who volunteer to be part of a panel (e.g., panelists). Panelists are users who have provided demographic information at the time of registration into a panel, allowing their demographic information to be linked to the media they choose to listen to or view. As a result, the panelists (e.g., the audience) represent a statistically significant sample of the large population (e.g., the census) of media consumers, allowing broadcasting companies and advertisers to better understand who is utilizing their media content and maximize revenue potential.

An on-device meter (ODM) can be implemented by software that is executed to collect data of interest concerning usage of the monitored device. The ODM can collect data indicating media access activities (e.g., website names, dates/times of access, page views, duration of access, clickstream data and/or other media identifying information (e.g., webpage content, advertisements, etc.)) to which a panelist is exposed. This data is uploaded, periodically or aperiodically, to a data collection facility (e.g., the audience measurement entity server). Given that a panelist submits their demographic data when registering with an AME, ODM data is advantageous in that it links this demographic information and the activity data collected by the ODM. Such monitoring activities are performed by tagging Internet media to be tracked with monitoring instructions, such as based on examples disclosed in Blumenau, U.S. Pat. No. 6,108,637, which is hereby incorporated herein by reference in its entirety. Monitoring instructions form a media impression request that prompts monitoring data to be sent from the ODM client to a monitoring entity (e.g., an AME such as The Nielsen Company, LLC) for purposes of compiling accurate usage statistics. In some examples, impression requests are executed whenever a user accesses media (e.g., from a server, from a cache). When a media user is also a part of the AME's panel (e.g., a panelist), the AME is able to match panelist demographics (e.g., age, occupation, etc.) to the panelist's media usage data (e.g., user-based impression counts, user-based total impression durations). As used herein, an impression is defined to be an event in which a home or individual accesses and/or is exposed to media (e.g., an advertisement, content in the form of a page view or a video view, a group of advertisements and/or a collection of content, etc.).

Database proprietors operating on the Internet (e.g., Facebook, Google, YouTube, etc.) provide services (e.g., social networking, streaming media, etc.) to registered subscribers. By setting cookies and/or other device/user identifiers, database proprietors can recognize their subscribers when the subscribers use the designated services. Examples disclosed in Mainak et al., U.S. Pat. No. 8,370,489, which is incorporated herein in its entirety, permit AMEs to partner with database proprietors to collect more extensive Internet usage data by sending an impression request to a database proprietor after receiving an initial impression request from a user (e.g., as a result of viewing an advertisement). Since the user may be a non-panelist (e.g., not a member of an AME panel with available associated demographics data), the AME can obtain data from the database proprietor corresponding to subscribers, given that the database proprietor logs/records a database proprietor demographic impression for the user if the given user is a subscriber. However, to protect the privacy of their subscribers, database proprietors generalize subscriber-level audience metrics by aggregating data. The AME therefore has access to third-party aggregate subscriber-based audience metrics where impression counts and unique audience sizes are reported by demographic category (e.g., females 15-20, males 15-20, females 21-26, males 21-26, etc.).

As used herein, a unique audience size is based on audience members distinguishable from one another, such that a single audience member/subscriber exposed a multiple number of times to the same media is identified as a single unique audience member. As used herein, a universe audience (e.g., a total audience) for media is a total number of persons that accessed the media in a particular geographic scope of interest and/or during a time of interest relating to media audience metrics. Determining if unique audience reached by certain media (e.g., an advertisement) can be used to identify if an AME client (e.g., an advertiser) is reaching a target audience base. When an AME logs an impression for access to media by a user not associated with any demographic information, the logged impression counts as a census-level impression. As such, multiple census-level impressions can be logged for the same user since the user is not identified as a unique audience member. Estimation of the census-level unique audience, impression counts (e.g., number of times a webpage has been viewed), and/or durations for individual demographics can increase the accuracy of usage statistics provided by monitoring entities such as AMEs. In examples disclosed herein, the term duration corresponds to an aggregate or total of the individual exposure times associated with impressions during a monitoring interval. For example, the aggregation or total can be at the individual level such that a duration is associated with an individual, the aggregation or total can be at the demographic level such that the duration is associated with a given demographic, the aggregation or total can be at the population level such that the duration is associated with a given population universe, etc. In examples disclosed herein, the duration of audience exposure for an individual may be logged over a measurement interval, but the actual number of impressions themselves may be unknown, given that an individual can watch, for example, between 20 to 30 minutes of different videos during a measurement interval, but the number of individual videos (total impressions) watched during the measurement interval is unknown.

In some examples, for census-level information, an AME has access to the total impression counts (e.g., total number of times a webpage was viewed) and total duration of impressions (e.g., length of time the webpage was viewed), but not the total unique audience (e.g., total number of distinguishable users). The AME can receive additional third-party data limited to users who subscribe to services provided by the third-party, for example, a database proprietor. For example, whereas census-level data includes total impression durations for individuals whose demographic information may not be available, the third-party level data includes subscriber-level data for audience size and durations that are tied to particular demographics (e.g., demographic-level data). As such, third-party data can provide the AME with partial audience and duration information down to an aggregate demographic level based on matching of subscriber data to different demographic categories performed by the database proprietor providing the third-party data. However, in the interest of subscriber privacy, third-party data does not provide audience and durations tied to a particular subscriber. Example methods, systems and apparatus disclosed herein allow estimation of census-level audience size and durations across different demographic categories based on third-party subscriber data that provides audience size and durations across the different demographic categories for a subset of the population universe.

Examples disclosed herein utilize third-party subscriber-level audience metrics that provide partial information on durations and unique audience size to overcome the anonymity of census-level impressions when estimating total unique audience sizes for media. Examples disclosed herein apply information theory to derive a solution to parse census-level information into demographics-based data. In examples disclosed herein, a census-level audience metrics estimator determines census-level unique audience and/or durations across demographics by determining probabilities of an individual in a given demographic being a member of the third-party subscriber data for each of the audience size and durations, determining a probability divergence between the third-party subscriber data and census-level data, and establishing a search space within bounds based on one or more equality constraints. The examples disclosed herein permit estimations that are logically consistent with all constraints, scale independence and invariance.

While examples disclosed herein are described in connection with website media exposure monitoring, disclosed techniques may also be used in connection with monitoring of other types of media exposure not limited to websites. Examples disclosed herein may be used to monitor for media impressions of any one or more media types (e.g., video, audio, a webpage, an image, text, etc.). Furthermore, examples disclosed herein can be used for applications other than audience monitoring (e.g., determining population size, number of attendees, number of observations, etc.). While the disclosed examples include data sets pertaining to impression counts and/or audiences, the data sets can also include data derived from other sources (e.g., monetary transactions, medical data, etc.).

FIG. 1 is a block diagram illustrating an example operating environment 100 in which an audience metrics estimator is implemented to determine census-level audience size and durations across demographics. The example operating environment 100 of FIG. 1 includes example users 110 (e.g., an audience), example user devices 112, an example network 114, an example third-party database proprietor 120, and an example audience measurement entity (AME) 130. The third-party database proprietor 120 includes an example subscriber database 122. The subscriber database 122 includes example subscriber audience size data 124, and example duration data 126. The AME 130 includes example census-level data 132 and an example audience metrics estimator 140. The census-level data 132 includes example total duration 134.

Users 110 include any individuals who access media on one or more user device(s) 112, such that the occurrence of access and/or exposure to media creates a media impression (e.g., viewing of an advertisement, a movie, a web page banner, a webpage, etc.). The example users 110 can include panelists that have provided their demographic information when registering with the example AME 130. When the example users 110 who are panelists utilize example user devices 112 to access media content through the example network 114, the AME 130 (e.g., AME servers) stores panelist activity data associated with their demographic information. The users 110 also include individuals who are not panelists (e.g., not registered with the AME 130). The users 110 include individuals who are subscribers to services provided by the database proprietor 120 and utilize these services via their user device(s) 112.

User devices 112 can be stationary or portable computers, handheld computing devices, smart phones, Internet appliances, and/or any other type of device that may be connected to a network (e.g., the Internet) and capable of presenting media. In the illustrated example of FIG. 1, the client device(s) 102 include a smartphone (e.g., an Apple® iPhone®, a Motorola™ Moto X™, a Nexus 5, an Android™ platform device, etc.) and a laptop computer. However, any other type(s) of device(s) may additionally or alternatively be used such as, for example, a tablet (e.g., an Apple® iPad™, a Motorola™ Xoom™, etc.), a desktop computer, a camera, an Internet compatible television, a smart TV, etc. The user device(s) 112 of FIG. 1 are used to access (e.g., request, receive, render and/or present) online media provided, for example, by a web server. For example, users 110 can execute a web browser on the user device(s) 112 to request streaming media (e.g., via an HTTP request) from a media hosting server. The web server can be any web browser used to provide media content (e.g., YouTube) that is accessed, through the example network 114, by the example users 110 on example user device(s) 112. Network 114 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, media (also referred to as a media item) is tagged or encoded to include monitoring or tag instructions. The monitoring instructions are computer executable instructions (e.g., Java or any other computer language or script) executed by web browsers accessing media content (e.g., via network 114). Execution of monitoring instructions causes the web browser to send an impression request to the servers of the AME 130 and/or the database proprietor 120. Demographic impressions are logged by the database proprietor 120 when user devices 112 accessing media are identified as belonging to registered subscribers to database proprietor 120 services. The database proprietor 120 stores data generated for registered subscribers in the subscriber data storage 122. Likewise, the AME 130 logs census-level media impressions (e.g., census-level impressions) for user devices 112, regardless of whether demographic information is available for such logged impressions. The AME 130 stores census-level data information in the census-level data storage 132. Further examples of monitoring instructions and methods of collecting impression data are disclosed in U.S. Pat. No. 8,370,489 entitled "Methods and Apparatus to Determine Impressions using Distributed Demographic Information," U.S. Pat. No. 8,930,701 entitled "Methods and Apparatus to Collect Distributed User Information for Media Impressions and Search Terms," and U.S. Pat. No. 9,237,138 entitled "Methods and Apparatus to Collect Distributed User Information for Media Impressions and Search Terms," all of which are hereby incorporated herein by reference in their entireties.

The AME 130 operates as an independent party to measure and/or verify audience measurement information relating to media accessed by subscribers of the database proprietor 120. When media is accessed by users 112, the AME 130 stores census-level information in the census-level data storage 132, including total durations 134 (e.g., length of time that a webpage was viewed) and/or total logged audience size 136 (e.g., total census-level audience size 110). The third-party database proprietor 120 provides the AME 130 with aggregate subscriber data that obfuscates the person-specific data, such that reference aggregates among the individuals within a demographic are available (e.g., third-party aggregate subscriber-based audience metrics). For example, the subscriber audience data 124 and durations data 126 are provided at a specific demographic level (e.g., females 15-20, males 15-20, females 21-26, males 21-26, etc.). For example, the subscriber audience data 124 corresponds to unique audience size data in the aggregate per demographic category.

The audience metrics estimator 140 of the AME 130 receives third-party aggregate subscriber-based audience metrics data (e.g., audience size data 124 and duration data 126). The audience metrics estimator 140 uses the aggregate data to estimate census-level audience size data and census-level durations data. In addition, the audience metrics estimator 140 uses the census-level data available to the AME 130 (e.g., total durations 134) to make the census-level audience size and duration estimates for the subscriber-based data, as further described below in connection with FIG. 2.

In some examples, the AME 130 can use the output of the audience metrics estimator 140 to select among advertisements to be provided to user device(s) 112 that subsequently access the media. In some examples, the AME 130 uses the audience metrics estimator 140 output to vary the type(s) of media that can be subsequently accessed by the user device(s) 112.

Figure 2:
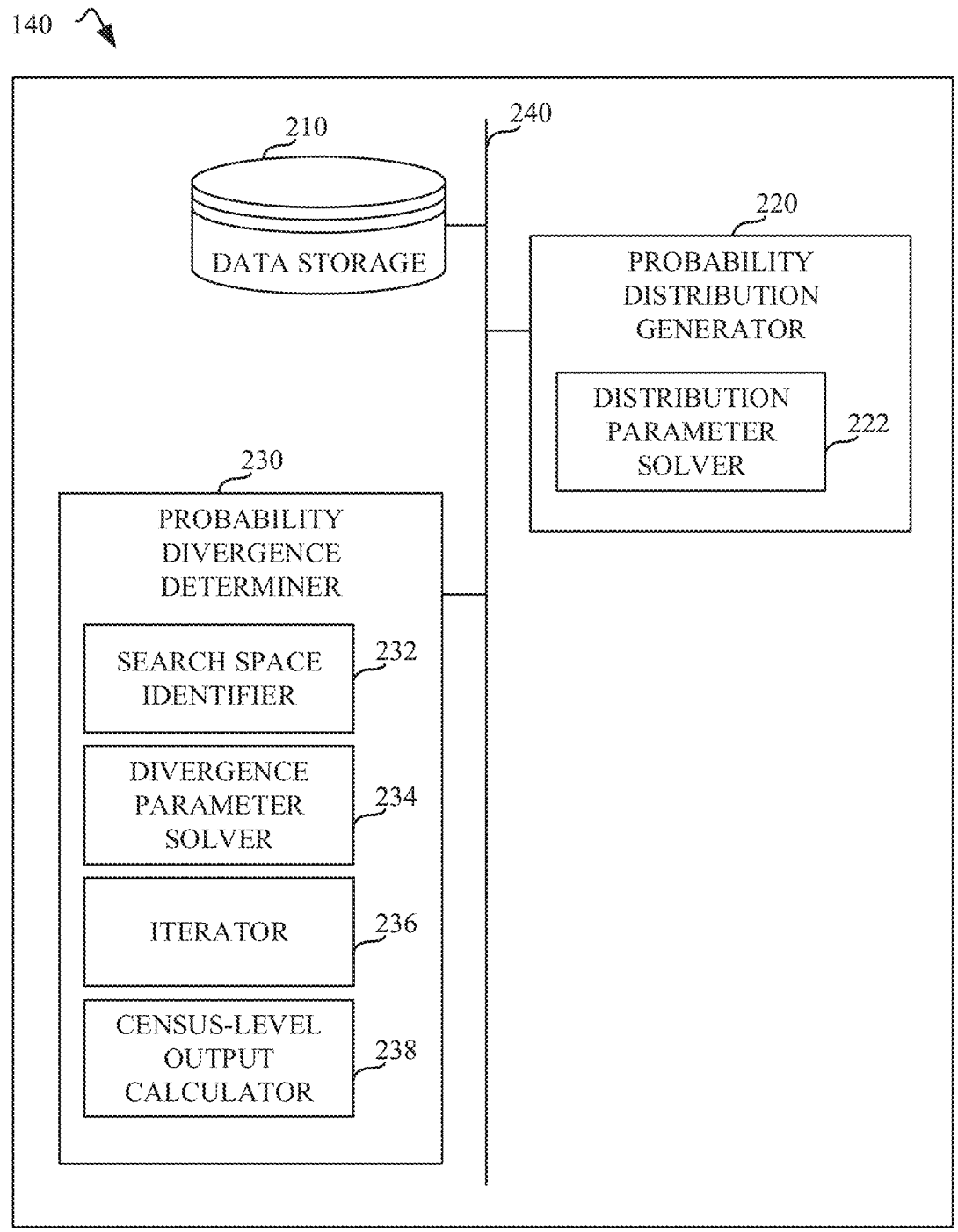
FIG. 2 is a block diagram of an example implementation of the audience metrics estimator of FIG. 1.

FIG. 2 is a block diagram of an example implementation of the audience metrics estimator 140 of FIG. 1. The example audience metrics estimator 140 includes example data storage 210, an example probability distribution generator 220, and an example probability divergence determiner 230, all of which are connected using an example bus 240. The probability distribution generator 220 includes an example distribution parameter solver 222. The probability divergence determiner 230 includes an example search space identifier 232, an example divergence parameter solver 234, an example iterator 236, and an example census-level output calculator 238.

The data storage 210 stores third-party aggregate subscriber-based audience metrics data retrieved from the third-party database proprietor 120. For example, data retrieved from the third-party database proprietor 120 and stored in the data storage 210 can include subscriber data 122 (e.g., third-party audience size 124 and third-party duration 126). The data storage 210 can also store census-level data 132 (e.g., total durations 134, total logged audience size 136, etc.). The audience metrics estimator 140 can retrieve the third-party and census-level data from the data storage 210 to perform census-level estimation calculations (e.g., determine census-level unique audience size and census-level durations for a given demographic). The data storage 210 may be implemented by any storage device and/or storage disc for storing data such as, for example, flash memory, magnetic media, optical media, etc. Furthermore, the data stored in the data storage 210 may be in any data format such as, for example, binary data, comma delimited data, tab delimited data, structured query language (SQL) structures, etc. While in the illustrated example the data storage 210 is illustrated as a single database, the data storage 210 can be implemented by any number and/or type(s) of databases.

The probability distribution generator 220 generates an estimate of the probability distribution for any individual within a given population, such that the distribution is subject to a probability of the individual being in the audience and having an average duration.

The distribution parameter solver 222 solves for parameters associated with the probability distributions for each individual of a given population. For example, the probability distribution generator 220 assigns probability density functions and/or person-specific probability distributions to third-party subscriber-based audience individuals. In some examples, probability density functions are assigned to subscriber audience individuals using data for third-party subscriber durations 126. In some examples, the probability distribution generator 220 assigns a probability of viewership occurring in the neighborhood of a set time interval (e.g., $t_1 < t < t_2$). In some examples, the probability distribution generator 220 also assigns person-specific probability distributions for individuals within a demographic (k) based on the probability of the individual being in an audience and having average duration. Once the probability distributions have been assigned, the distribution parameter solver 222 determines the solution for the probability distribution such that the final solution can be expressed analytically, as described in more detail in association with FIG. 4.

The probability divergence determiner 230 can be used to determine probability divergences between prior and posterior distributions in a given demographic using available third-party subscriber data 122 and census-level data 132 of FIG. 1. For example, the probability divergence determiner 230 can define third-party data as a prior probability distribution in the $k^{th}$ demographic and define the census-level data as a posterior probability distribution in the $k^{th}$ demographic, as described in more detail below in association with FIG. 5. In some examples, the probability divergence can be determined using a Kullback-Leibler (KL) divergence between the two distributions.

To yield the solutions to census-level audience and durations for different demographic categories based on the probability divergence, the probability divergence determiner 230 uses the search space identifier 232 to establish a search space within a given set of bounds based on a census-level duration equality constraint. For example, once the equality constraint is established, the divergence parameter solver 234 can evaluate the divergence parameters based on the equality constraint. In some examples, the divergence parameter solver 234 uses the iterator 236 to iterate over a search space determined by the search space identifier 232 until the equality constraint is satisfied (e.g., the equality constraint defined by the summation of the census-level duration for each demographic being equal to the total reference census-level duration). The census-level output calculator 238 estimates census-level individual data (e.g., audience and duration), based on solutions that satisfy the equality constraint, as described in more detail in association with FIG. 6.

While an example manner of implementing the audience metrics estimator 140 is illustrated in FIGS. 1 and 2, one or more of the elements, processes and/or devices illustrated in FIGS. 1 and 2 may be combined, divided, re-arranged, omitted, eliminated and/or implemented in any other way. Further, the example data storage 210, the example probability distribution generator 220, the probability divergence determiner 230, and/or, more generically, the example audience metrics estimator 140 of FIGS. 1-2 may be implemented by hardware, software, firmware and/or any combination of hardware, software and/or firmware. Thus, for example, any of the example data storage 210, the example probability distribution generator 220, the probability divergence determiner 230 and/or, more generically, the example audience metrics estimator 140 of FIGS. 1-2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data storage 210, the example probability distribution generator 220, and/or the probability divergence determiner 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics estimator 140 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example machine readable instructions for implementing the example audience metrics estimator 140 of FIGS. 1-2 are shown in FIGS. 3-6, respectively. The machine-readable instructions may be one or more executable programs or portion(s) of an executable program for execution by a processor such as the processor 906 shown in the example processor platform 900 discussed below in connection with FIGS. 3-6. The program may be embodied in software stored on a non-transitory computer readable storage medium such as a CD-ROM, a floppy disk, a hard drive, a digital versatile disk (DVD), a Blu-ray disk, or a memory associated with the processor 906, but the entire program and/or parts thereof could alternatively be executed by a device other than the processor 906 and/or embodied in firmware or dedicated hardware. Further, although the example program is described with reference to the flowcharts illustrated in FIGS. 3-6, many other methods of implementing the example audience metrics estimator 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 5 and/or 6 may be implemented using executable instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
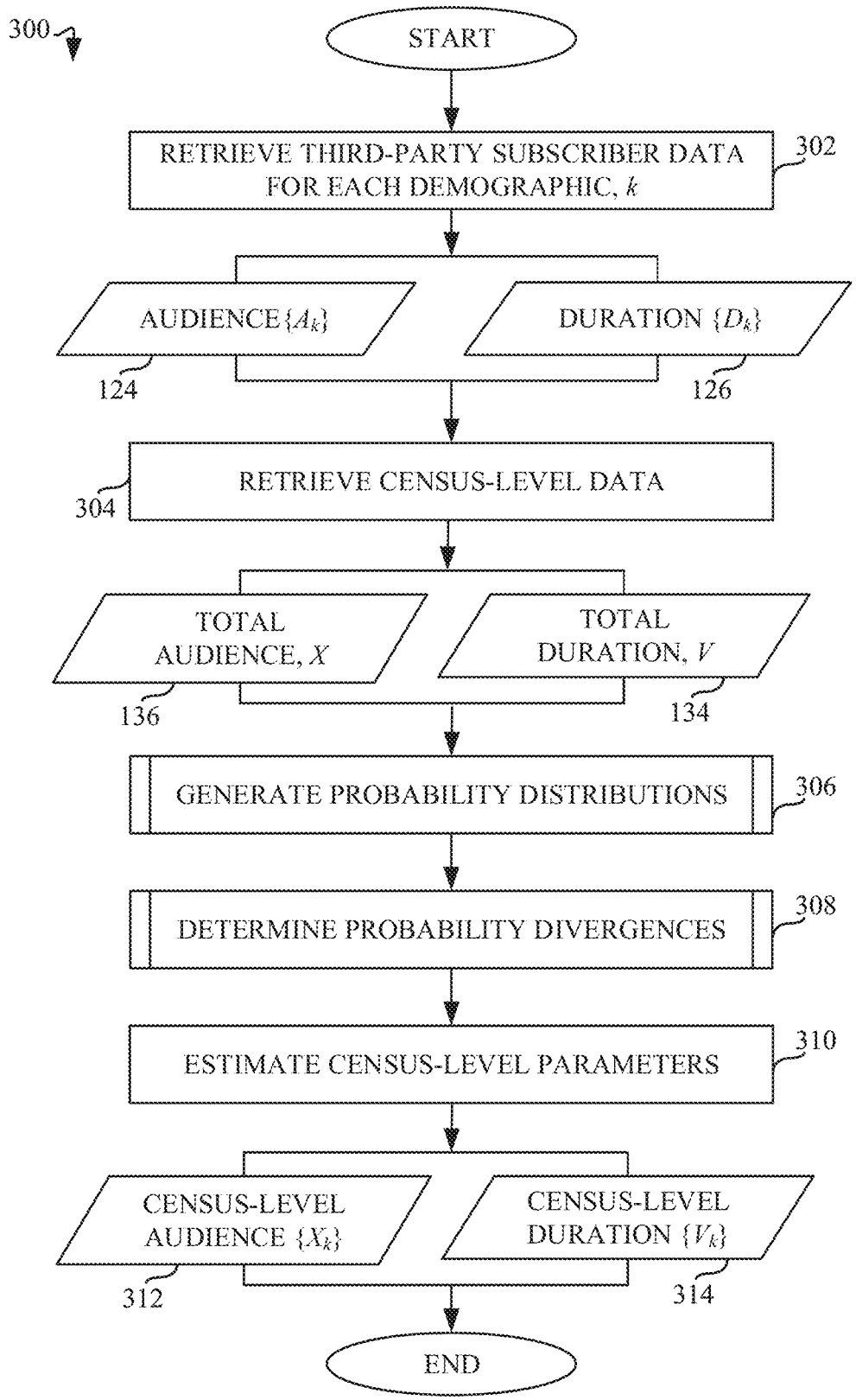
FIG. 3 is a flowchart representative of example machine readable instructions which may be executed to implement elements of the example audience metrics estimator of FIGS. 1-2.

FIG. 3 is a flowchart 300 representative of machine readable instructions which may be executed to implement elements of the example audience metrics estimator 140 of FIG. 2. The example audience metrics estimator 140 retrieves third-party subscriber data (e.g., available from the database proprietor 120 of FIG. 1) for each demographic (k) from the data storage 202 of FIG. 2 (block 302). The third-party database proprietor 120 determines audience size and duration data for different demographic categories of subscribers based on subscriber data 122 collected when a subscriber is exposed to impressions (e.g., third-party media) on user devices 112. For example, a logged duration 126 is associated with a specific subscriber (e.g., users 110). Based on this data, the audience metrics estimator 140 can retrieve inputs of subscriber-based audience size $\{A_k\}$ data (e.g., audience size data 124) and duration $\{D_k\}$ data (e.g. duration data 126) for different aggregate demographic categories. The example audience metrics estimator 140 also retrieves census-level data from the census-level data storage 132 of the AME 130 (block 304). For example, the AME 130 can also access logged impressions that are made by users 110 when using devices 112, but the data is not associated with specific demographics of the users when such users are not members of an AME panel, such that the AME 130 can determine the total logged duration 134 (e.g., total census-level duration by users 110) and/or the total logged audience size 136 (e.g., total census-level audience size 110), while not differentiating between individual users. As such, the census-level data storage 132 provides inputs to the audience metrics estimator 140 of total census-level duration (V) data and/or total census-level audience size (X) data (e.g., total audience 136). Using the third-party and census-level data, the example probability distribution generator 220 of the example audience metrics estimator 140 determines the probability of an individual in a given demographic k being a member of the third-party subscriber data (e.g., audience size $\{A_k\}$ data, duration $\{V_k\}$ data) and generates a probability distribution for each individual within the total population subject to these constraints, such that the distribution parameter solver 222 determines the distribution parameters that can be further used to identify potential solutions for census-level audience and duration data (block 306). Once the probability distributions have been generated, the example probability divergence determiner 230 of FIG. 2 determines probability divergences between the third-party and census-level data (block 308). Furthermore, the example probability divergence determiner 230 estimates census-level individual data (e.g., unique audience size and durations) using the census-level output calculator 238 based on the probability distribution parameters calculated using the distribution parameter solver 222 and the probability divergence parameters calculated using the divergence parameter solver 234 (block 310). The example audience metrics estimator 140 provides census-level outputs, including output estimates for census-level audience size $\{X_k\}$ (block 312) and census-level duration $\{V_k\}$ (block 314). As such, using census-level data (e.g., total duration 134, total audience 136) and third-party data (e.g., audience size 124 and duration 126), the audience metrics estimator 140 estimates the census-level unique audience 312 and duration 314 for individual demographic categories.

Figure 4:
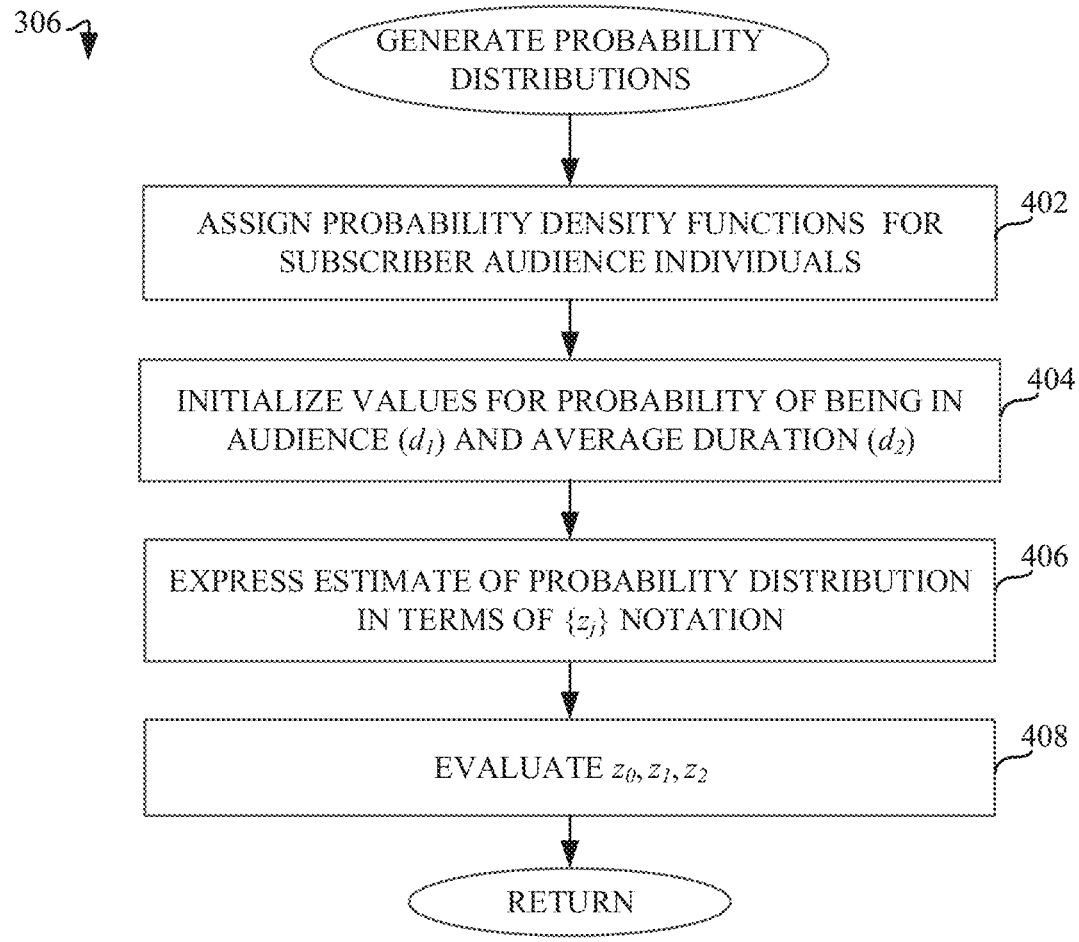
FIG. 4 is a flowchart representative of example machine readable instructions which may be executed to implement elements of the example audience metrics estimator of FIGS. 1-2, the flowchart representative of instructions used to generate probability distributions.

FIG. 4 is a flowchart 306 representative of machine readable instructions which may be executed to implement elements of the example audience metrics estimator 140 of FIG. 2, to generate probability distributions. For example, the probability distribution generator 220 assigns probability density functions $[p_t^{(i)}]$ for panel audience individuals (i) using durations (t) (block 402). Each person has a fixed, but unknown, number of impressions (n) and duration time (t) across all of the (unknown) impressions, both in the census-level and third-party database (e.g., 'John Smith' has a duration totaling 20 minutes, of which only 10 minutes were registered in a database, or none at all). However, aggregate information obfuscates the person-specific data and leaves a reference aggregate among the individuals within a demographic, such that the uncertainty for each person can be expressed in the form of a probability distribution. Such a distribution is a mixture of a point mass distribution and a continuous distribution. The point mass distribution is at t=0, indicating that the individual did not view any pages, thereby resulting in no duration. The continuous distribution is continuous along the open interval (0,∞).

For purposes of deriving the solution to individual probability distribution estimates using the example probability distribution generator 220, an assumption is made that there are a total of U individuals in the total population. The uncertainty with a collection of U probability distributions going across the possibility of each individual having any durations (t), along with not having any durations, can be expressed for each person, such that, for example, if U=5, persons 1-5 are assigned probabilities as follows: $[p_0^{(1)}, \{p_t^{(1)}:t>0\}]$, $[p_0^{(2)}, \{p_t^{(2)}:t>0\}]$, $[p_0^{(3)}, \{p_t^{(3)}:t>0\}]$, $[p_0^{(4)}, \{p_t^{(4)}:t>0\}]$, and $[p_0^{(5)}, \{p_t^{(5)}:t>0\}]$. The probability distribution generator 220 assigns $p^{(i)}$ as the probability that the $i^{th}$ person did not have any durations (e.g., point mass distribution), and assigns $p_t^{(i)}$ as the probability density function that represents the probabilities that the $i^{th}$ person has a duration t. For example, the probability distribution generator 220 assigns the probability (Pr) that an individual has an aggregate total duration between $t_1$ and $t_2$ time units across an unknown number of impressions (e.g., an individual watched between 20 to 30 minutes of different videos, but the number of individual videos watched is unknown), in accordance with Equation 1 below, with the total probability equivalent to one, as shown in Equation 2, such that an individual has a total duration of zero or any positive real value:

$$Pr(t_1 < t < t_2) = \int_{t_1}^{t_2} p_t^{(i)} dt \qquad \text{Equation 1}$$

$$p_0^{(i)} + \int_0^\infty p_t^{(i)} dt = 1 \qquad \text{Equation 2}$$

Without knowledge of demographic information, either for the audience size or the impression durations, adding a demographic label (e.g., male, New York, etc.) does not impact the probability distribution itself, while knowledge of demographic specific information does impact the distribution. The probability distribution generator 220 assigns every individual within a given demographic the same probability distribution if no further information of individual behavior is available except for the known total behavior (e.g., given a total of 100 individuals with a known total duration of 600 minutes, each individual is assigned an average duration of 6 minutes). Given that the probability distribution generator 220 has access to both audience and duration information from the third-party subscriber data 122 (e.g., audience size 124 and duration 126), the probability distribution generator 220 assigns a person-specific probability distribution (H) for individuals within a demographic using the probability of being in the audience ($d_1$) and the average duration per individual ($d_2$) (block 404). Such a person-specific distribution can be expressed in accordance with Equations 3-6 below:

$$\underset{P}{\text{maximize}}\ H = (-p_0 \log(p_0)) + \left(-\int_0^\infty p_t \log(p_t) dt\right) \quad \text{Equation 3}$$

$$\text{subject to } p_0 + \int_0^\infty p_t dt = 1 \quad \text{Equation 4}$$

$$\int_0^\infty p_t dt = d_1 \quad \text{Equation 5}$$

$$\int_0^\infty t p_t dt = d_2 \quad \text{Equation 6}$$

The probability distribution generator 220 can re-arrange the solution to the person-specific distribution problem of Equations 3-6 (e.g., express in terms of z notation) in accordance with Equations 7-10, subject to the final solution for the set of $\{z_j\}$ expressed in accordance with Equation 7 (block 406):

$$p_t = \begin{cases} z_0 & t = 0 \\ z_0 z_1 z_2^t & t > 0 \end{cases} \quad \text{Equation 7}$$

$$p_0 + \int_0^\infty p_t dt = z_0 + \int_0^\infty z_0 z_1 z_2^t dt = z_0 - \frac{z_0 z_1}{\log(z_2)} = 1 \quad \text{Equation 8}$$

$$\int_0^\infty p_t dt = \int_0^\infty z_0 z_1 z_2^t dt = -\frac{z_0 z_1}{\log(z_2)} = d_1 \quad \text{Equation 9}$$

$$\int_0^\infty t p_t dt = \int_0^\infty t z_0 z_1 z_2^t dt = \frac{z_0 z_1}{(\log(z_2))^2} = d_2 \quad \text{Equation 10}$$

The distribution parameter solver 222 solves for $z_0$, $z_1$, and $z_2$ (block 408). For example, the direct solutions to $z_0$, $z_1$, and $z_2$ can be represented in accordance with Equations 11, 12, and 13, respectively:

$$z_0 = 1 - d_1 \quad \text{Equation 11}$$

$$z_1 = \frac{d_1^2}{(1 - d_1) d_2} \quad \text{Equation 12}$$

$$z_2 = e^{-\frac{d_1}{d_2}} \quad \text{Equation 13}$$

Once a solution to the individual probability distribution estimate is available, a probability of a given duration characteristic can be calculated for each individual (e.g., audience member). For example, if among 100 individuals there is an audience of 50 people and 200 time units of duration, the total probability ($z_0$), the probability of being in the audience ($z_1$), and the probability of duration ($z_2$) can solved for as shown below in Example 1, based on Equations 11-13:

$$d_0 = \frac{100}{100} \rightarrow z_0 = 1 - d_1 = 0.5 \quad \text{Example 1}$$

$$d_1 = \frac{50}{100} \rightarrow z_1 = \frac{d_1^2}{(1-d_1) d_2} = 0.25$$

$$d_2 = \frac{200}{100} \rightarrow z_2 = e^{-\frac{d_1}{d_2}} = e^{-\frac{1}{4}}$$

In this example, the probability of a given duration characteristic can be calculated for each individual, such that if $p_0 = z_0 = 0.5$, there is a 50% chance of the individual not viewing any duration. To estimate the probability of the audience in this example having a duration of at most 5 time units, the audience metric estimator 140 can apply Equation 1 to generate an estimate, as shown below in Example 2:

$$Pr(0 < t < 5) = \int_0^5 p_t dt = \int_0^5 \frac{1}{8} e^{-\frac{1}{4}} dt \approx 0.356 \quad \text{Example 2}$$

Figure 5:
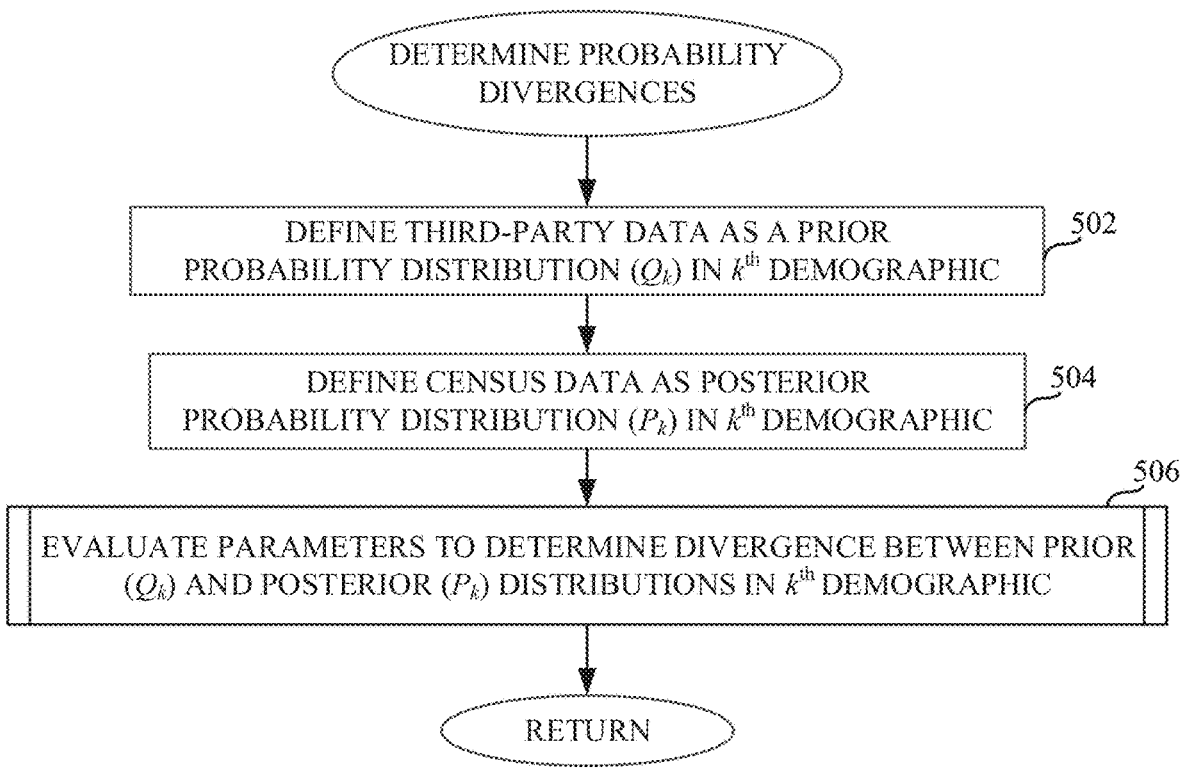
FIG. 5 is a flowchart representative of example machine readable instructions which may be executed to implement elements of the example audience metrics estimator of FIGS. 1-2, the flowchart representative of instructions used to determine probability divergences.

FIG. 5 is a flowchart 308 representative of machine readable instructions which may be executed to implement elements of the example audience metrics estimator 140 of FIG. 2, the flowchart representative of instructions used to determine probability divergences. Once the audience metrics estimator 140 generates probability distributions using the probability distribution generator 220, as described above in connection with FIG. 4, the probability divergence determiner 230 determines probability divergences. A probability divergence allows for a comparison between two probability distributions. In the examples disclosed herein, the probability divergence permits a comparison between the distribution of third-party subscriber data and the distribution of census-level data. In the examples disclosed herein, a Kullback-Leibler probability divergence (KL divergence) is used to measure the difference between these two probability distributions (e.g., determine how well one probability distribution approximates another probability distribution). For example, the probability divergence determiner 230 defines third-party subscriber data as a prior distribution (Q) and census-level data as a posterior distribution (P). The audience size and durations are equally divided across the entire population of individuals in a $k^{th}$ demographic ($U_k$), such that U is representative of a population universe estimate. A universe estimate (e.g., a total audience) can be defined as, for example, the total number of persons that accessed the media in a particular geographic scope of interest and/or during a time of interest relating to media audience metrics. For example, the universe estimate can be based on census-level data 132 obtained by the AME 130 during assessment of logged impressions by user devices 112. For example, the $k^{th}$ demographic can represent a demographic category (e.g., females 35-40, males 35-40, etc.). As such, the probability divergence determiner 230 defines third-party data as a prior probability distribution in the $k^{th}$ demographic ($Q_k$) (block 502) and census-level data as a posterior probability distribution in the $k^{th}$ demographic ($P_k$) (block 504) in a manner consistent with Equations 19-22:

$$d_0^Q = 1 \quad d_0^P = 1 \qquad \text{Equation 14}$$

$$d_1^Q = \frac{A_k}{U_k} \quad d_1^P = \frac{X_k}{U_k} \qquad \text{Equation 15}$$

$$d_2^Q = \frac{D_k}{U_k} \quad d_2^P = \frac{V_k}{U_k} \qquad \text{Equation 16}$$

In Equations 14-16, the probability that a specific individual in the $k^{th}$ demographic is a member of the third-party aggregated subscriber audience total ($A_k$) is defined as $A_k/U_k$ and the probability that a specific individual in the $k^{th}$ demographic has a duration in the third-party aggregated duration total ($D_k$) is defined as $D_k/U_k$. In the examples disclosed herein, the audience metrics estimator 140 accesses third-party data (e.g., subscriber data 122 of FIG. 1), which provides anonymized aggregate data for subscriber audience ($A_k$) and durations ($D_k$) (e.g., audience 124 and duration 126 data, respectively, of FIG. 1). However, for census-level data, the audience metric estimator 140 may have access to census-level total durations 134 and/or census-level audience size 136. In Equations 14-16, the probability that a specific individual in the $k^{th}$ demographic is a member of the census-level unique audience total ($X_k$) is defined as $X_k/U_k$ and the probability that a specific individual in the $k^{th}$ demographic has a duration in the census-level duration total ($V_k$) is defined as $V_k/U_k$. Once the probability divergence determiner 230 has defined the prior and posterior distributions for the third-party subscriber data and the census-level data (blocks 502 and 504), respectively, the divergence parameter solver 234 determines divergences between prior and posterior distributions in the $k^{th}$ demographic in order to find solutions for the census-level unique audience and duration (block 506), as detailed below in connection with FIG. 6.

Figure 6:
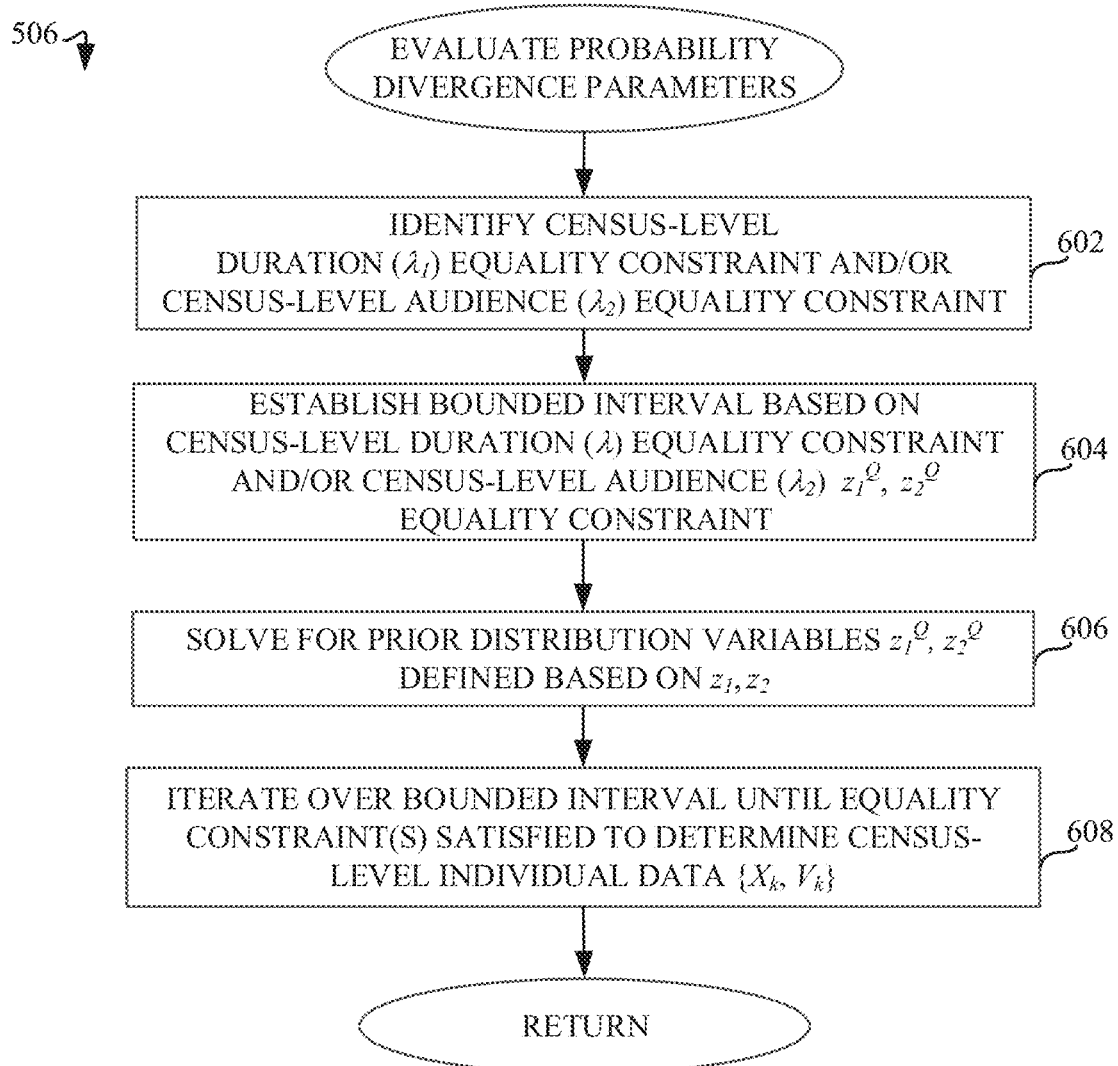
FIG. 6 is a flowchart representative of example machine readable instructions which may be executed to implement elements of the example audience metrics estimator of FIGS. 1-2, the flowchart representative of instructions used to evaluate probability divergence parameters of FIG. 5.

FIG. 6 is a flowchart 506 representative of machine readable instructions which may be executed to implement elements of the example audience metrics estimator 140 of FIG. 2, the flowchart representative of instructions used to determine probability divergences of FIG. 5. Except for having different values, the prior ($Q_k$) and posterior ($P_k$) distributions are in the same domain and have the same linear constraints, allowing use of information theory and a maximum entropy-based solution to directly determine a Kullback-Leibler divergence of an individual from third party data to census-level data. Therefore, the divergence parameter solver 234 defines the divergence (e.g., Kullback-Leibler divergence $KL(P_k:Q_k)$, where $P_k$ is a posterior probability distribution defining census-level data and $Q_k$ is a prior probability distribution defining third-party subscriber data) of an individual from third-party subscriber data to census-level data in accordance with Equation 17:

$$KL(P_k : Q_k) = \sum\nolimits_{j=0}^{m} d_j^P \log\left(\frac{z_j^P}{z_j^Q}\right) \qquad \text{Equation 17}$$

In Equation 17, the divergence parameter solver 234 expresses the KL divergence in terms of z notation, referring to the solutions to $z_0$, $z_1$, and $z_2$ determined in Equations 11-13 as previously described, and reproduced below as Equations 24-27. In some examples, the divergence parameter solver 234 expands Equation 17 to yield a description of how any given individual's distribution within the $k^{th}$ demographic can change, in accordance with Equation 18:

$$\begin{aligned} KL(P_k : Q_k) &= \sum\nolimits_{j=0}^{m} d_j^P \log\left(\frac{z_j^P}{z_j^Q}\right) \qquad \text{Equation 18} \\ &= \sum_{j=0}^{m} d_j^P \left[\log(z_j^P) - \log(z_j^Q)\right] \\ &= (d_0^P)\left[\log(z_0^P) - \log(z_0^Q)\right] \ldots \\ &\quad + (d_1^P)\left[\log(z_1^P) - \log(z_1^Q)\right] \ldots \\ &\quad + (d_2^P)\left[\log(z_2^P) - \log(z_2^Q)\right] \ldots \end{aligned}$$

Given that all individuals in a $k^{th}$ demographic are assumed to have the same behavior, the divergence parameter solver 234 multiplies $KL(P_k:Q_k)$ by the number of individuals in the $k^{th}$ demographic ($U_k$) to determine how the individuals within a demographic can change collectively (e.g., since the divergences are the same, multiplication is used instead of adding the KL-divergence of each individually together). To determine the total divergence across the population, the divergence parameter solver 234 sums across all divergences and across all demographics, in accordance with Equation 19:

$$KL(P:Q) = \Sigma_{k=1}^{K} U_k(KL(P_k:Q_k)) \qquad \text{Equation 19}$$

To fully describe the behavior of audiences and durations, the divergence parameter solver 234 minimizes Equation 19 in accordance with Equation 20:

$$\underset{\{V_k\},\{X_k\}}{\text{minimize}} \quad KL(P:Q) = \sum\nolimits_{k=1}^{K} U_k(KL(P_k:Q_k)) \qquad \text{Equation 20}$$

$$\text{subject to} \quad \sum_{k=1}^{K} X_k = X$$

$$\text{subject to} \quad \sum_{k=1}^{K} V_k = V$$

In Equation 20, $\{X_k\}$ and $\{V_k\}$ represent census-level data pertaining to unique audience size impression duration, respectively, all of which are unknown. However, Equation 20 is subject to a sum of the values of the unique audience size durations $\{V_k\}$ being equal to the total census-level duration (V) (e.g., total duration 134). Likewise, Equation 20 is subject to a sum of the values of the unique audience sizes $\{X_k\}$ being equal to the total census-level audience size (X) (e.g., total audience 136). These constraints are also referred to herein as equality constraints. In some examples, the divergence parameter solver 234 solves the system of Equation 20 by taking a Lagrangian ($\mathcal{L}$) of the system in accordance with Equations 21-23 (e.g., solving for when the 2K+2 system of equations are all zero), where the solution is for all ($\forall$) demographics $k=\{1, 2, \ldots, K\}$, in addition to setting the partial derivative with respect to the Lagrange multiplier (X) equal to 0 (e.g., Equation 24):

$$\mathcal{L} = KL(P:Q) - \lambda_1\left(\sum_{k=1}^{K} X_k - X\right) - \lambda_2\left(\sum_{k=1}^{K} V_k - V\right) \quad \text{Equation 21}$$

$$\frac{\partial \mathcal{L}}{\partial V_k} = 0 \quad \forall k = \{1, 2, \ldots, K\} \quad \text{Equation 22}$$

$$\frac{\partial \mathcal{L}}{\partial X_k} = 0 \quad \forall k = \{1, 2, \ldots, K\} \quad \text{Equation 23}$$

$$\frac{\partial \mathcal{L}}{\partial \lambda_1} = 0 \quad \frac{\partial \mathcal{L}}{\partial \lambda_2} = 0 \quad \text{Equation 24}$$

The divergence parameter solver 234 solves the Lagrangian of Equation 21 using the Lagrange multipliers ($\lambda_1$, $\lambda_2$) to represent the census-level total duration constraint ($\Sigma_{k=1}^{K} V_k = V$) and the census-level total audience size constraint ($\Sigma_{k=1}^{K} X_k = X$) of Equation 20. Other than the constraint of the census-level total duration across demographics ($\lambda_1$) and/or total audience size across demographics ($\lambda_2$), each demographic is mutually exclusive and does not impact the other demographics. Therefore, besides that addition of the constraints noted above, the Lagrangian-based ($\mathcal{L}$) derivative of census-level unique audience size $\{X_k\}$, and duration $\{V_k\}$ involve terms of the same demographic (e.g., females 35-40 years of age). As such, the Lagrangian-based ($\mathcal{L}$) derivative of census-level unique audience size $\{X_k\}$ and duration $\{V_k\}$ can be expressed in accordance with Equations 25 and 26, respectively:

$$\frac{\partial \mathcal{L}}{\partial X_k} = \log\left(\frac{X_k^2}{V_k(U_k - X_k)}\right) - \log\left(\frac{A_k^2}{D_k(U_k - A_k)}\right) - \lambda_1 \quad \text{Equation 25}$$

$$\frac{\partial \mathcal{L}}{\partial V_k} = \log\left(e^{-\frac{X_k}{V_k}}\right) - \log\left(e^{-\frac{A_k}{D_k}}\right) - \lambda_2 \quad \text{Equation 26}$$

Furthermore, Equation 26 can be simplified to be Equation 27 as follows:

$$\frac{\partial \mathcal{L}}{\partial V_k} = \left(-\frac{X_k}{V_k}\right) - \left(-\frac{A_k}{D_k}\right) - \lambda_2 \quad \text{Equation 27}$$

Although examples disclosed herein are described in connection with estimating census-level audience sizes and/or census-level impression durations for multiple demographics, examples disclosed herein can also be used to estimate census-level audience sizes and/or census-level impression durations for a single demographic. As such, a single aggregate collection of a group of individuals (e.g., a single demographic, an entire population, or any other collective group treated as a while, etc.) can be considered. This allows total impressions and/or durations to be considered across a collective group of entities, or a single entity by itself (e.g., a group of one). As such, the single dimension methodology gives a quick first order estimate of estimated census audience and/or duration impressions. A single-demographic version of the above Equations 25-26 can be obtained as follows:

$$\frac{\partial \mathcal{L}}{\partial X} = \log\left(\frac{X^2}{V(U - X)}\right) - \log\left(\frac{A^2}{D(U - A)}\right)$$

-continued $$\log\left(\frac{X^2}{V(U - X)}\right) = \log\left(\frac{A^2}{D(U - A)}\right)$$

$$\frac{X^2}{V(U - X)} = \frac{A^2}{D(U - A)}$$

The audience metrics estimator 140 determines solutions to the census-level individual data $\{X_k, V_k\}$ based on Equations 25 and 27 (Equation 27 being a simplified version of Equation 26), where both $X_k$ and $V_k$ appear within each equation, such that these equations can be solved simultaneously when equaled to zero. For example, the solutions to $\{X_k\}$ and $\{V_k\}$ can be determined by first defining Equations 25 and 27 using Equations 28 and 29, respectively:

$$s_k^{(1)} = \frac{A_k^2}{D_k(U_k - A_k)} = z_1^Q \quad \text{(for demographic } k\text{)} \quad \text{Equation 28}$$

$$s_k^{(2)} = e^{-\frac{A_k}{D_k}} = z_2^Q \quad \text{(for demographic } k\text{)} \quad \text{Equation 29}$$

The final solution for $\{X_k\}$ and $\{V_k\}$ can be obtained by substituting $c_1 = \exp(\lambda_1)$ and $c_2 = \lambda_2$ to yield Equations 30 and 31, which can then be used to determine Equations 32 and 33 for $\{X_k\}$ and $\{V_k\}$, respectively:

$$f_k = -(c_2 + \log(s_k^{(2)}))^{-1} = \left(\frac{A_k}{D_k} - c_2\right)^{-1} \quad \text{Equation 30}$$

$$o_k = c_1 s_k^{(1)} f_k \quad \text{Equation 31}$$

$$p_k = \frac{o_k}{1 + o_k}$$

$$X_k = p_k U_k \quad \text{Equation 32}$$

$$V_k = f_k X_k \quad \text{Equation 33}$$

In the example of Equation 30, $f_k$ represents an estimated average duration within a census-level audience for the km demographic. In the example of Equation 31, $o_k$ represents odds of an individual in the $k^{th}$ demographic of being a member of the audience, with $p_k$ used to convert odds to probabilities. As such, in the example of Equation 31, $p_k$ represents the probability that an individual in the $k^{th}$ demographic will be a member of the audience. By multiplying $p_k$ by the population ($U_k$), the expected number of actual individuals is determined. In the example of FIG. 1, the universe estimate can be based on census-level data 132 obtained by the AME 130 during assessment of logged impressions by user devices 112. As such, the variables $f_k$ and $p_k$ of Equations 30 and 31, respectively, are used to estimate $\{X_k\}$ and $\{V_k\}$ of Equations 32 and 33, respectively.

As part of the solution, the search space identifier 232 establishes a bounded interval based on census-level total duration ($\lambda_1$) and/or census-level total audience size ($\lambda_2$) equality constraints (blocks 602, 604). Such an interval can be represented using $c_1$ and $c_2$ as previously defined, where $c_1=\exp(\lambda_1)$ and $c_2=\lambda_2$, such that the interval is $\{c_1, c_2\}$ and can be modified until the equality constraints are satisfied. The interval $\{c_1, c_2\}$ can be further defined in accordance with Equations 34 and 35:

$$0 \le c_1 < \infty \qquad \text{Equation 34}$$

$$-\infty \le c_2 \le \min\left(\frac{A_k}{D_k}\right) \qquad \text{Equation 35}$$

With respect to Equation 35, minimization occurs across all demographics, since as $c_2$ increases, the estimate of $X_k$ increases and a maximum limit for $X_k$ is reached at the total number of individuals within the demographic $k(U_k)$. As such, the upper limit for the value of $c_2$ for any demographic $k$ can be defined as the ratio of third-party subscriber audience size $(A_k)$ to third-party duration $(D_k)$. Likewise, the value of $c_2$ can be below the minimum limit across all demographics to allow for logical consistency across all demographics. If the variable $m_k$ is defined as an average duration viewed per demographic $k$ $$\left(\text{e.g., } m_k = \frac{D_k}{A_k}\right),$$

with the variable $m^*$ representative of the largest average across all demographics, the limit on $c_2$ can be re-written as Equation 36:

$$-\infty \le c_2 \le \min\left(\frac{1}{m^*}\right) \qquad \text{Equation 36}$$

Considering Equation 21 (reproduced below), when either census-level total duration $(\lambda_1)$ or census-level total audience size $(\lambda_2)$ is set to zero (e.g., $\lambda_1=0$ or $X_2=0$), the terms which contribute to the corresponding constraint are eliminated, such that the expression becomes unconstrained:

$$\mathcal{L} = KL(P:Q) - \lambda_1(\Sigma_{k=1}^K X_k - X) - \lambda_2(\Sigma_{k=1}^K V_k - V) \qquad \text{Equation 21}$$

As such, using a transform of $c_1=\exp(\lambda_1)$ and $c_2=\lambda_2$, $c_1$ can be predefined as $c_1=1$ or $c_2$ can be predefined as $c_2=0$ if the corresponding aggregate constraint is not specified. Therefore, the potential combinations that can arise depending on given third-party and census-level information can include the four examples presented below (with additional corresponding examples in FIGS. 7A-7C), where the scaling property of changing the duration time units (e.g., from hours to seconds, etc.) is maintained throughout all four scenarios:

(1) Both total census-level audience size and total census-level impression duration $\{X, V\}$ are unknown, with $c_1=1$ and $c_2=0$, such that no evaluation or optimization is required, and all demographics $k$ have $X_k A_k$ and $V_k=D_k$ (e.g., census-level audience size $X_k$ is equivalent to third-party audience size $A_k$ and census-level impression duration $V_k$ is equivalent to third-party impression duration $D_k$);

(2) Total census-level audience size X is known and given, while total census-level impression duration V is unknown. In such a case, $c_1$ can be solved to match the total census-level audience size X constraint, with $c_2=0$;

(3) Total census-level impression duration V is known and given, while total census-level audience size X is unknown. In such a case, $c_1=1$ and $c_2$ can be solved to match the total census-level impression duration V constraint;

(4) Both total census-level audience size and total census-level impression duration $\{X, V\}$ are known and given, such that $c_1$ can be solved to match the total census-level audience size X constraint and $c_2$ can be solved to match the total census-level impression duration V constraint.

Using the bounded interval of Equations 34-35 determined by the search space identifier 232, the audience metrics estimator 140 estimates the census-level audience size $\{X_k\}$ and/or census-level duration $\{T_k\}$ for each demographic based on solutions to $s_k^1$ and $s_k^2$ of Equations 28-29 (e.g., prior distribution variables $z_1^Q$ and $z_2^Q$) (block 606). The solution is determined once the search space identifier 232 has verified that one or more of the equality constraint(s) (e.g., Equation 20) have been met (block 608). For example, the iterator 236 can iterate over a given search space until an equality constraint is met, while the census-level output calculator 238 outputs the final census-level individual data the meets the given constraint(s). As such, access to the third-party subscriber data allows the audience metrics estimator 140 to estimate the census-level unique audience size and/or duration by solving for $\{X_k, T_k\}$.

FIGS. 7A-7C include example data sets providing third-party subscriber and census-level data, including total duration data used by the example audience metrics estimator 140 of FIGS. 1-2 to generate census-level estimations of unique audience and/or duration across demographics. FIG. 7A sets forth a table 700 with the notations used throughout when determining census-level data based on third-party subscriber data. For example, reference number 702 identifies the demographics k (e.g., demographic 1 can refer to females aged 35-40, demographic 2 can refer to males aged 35-40, etc.). Reference number 704 identifies the population (e.g., universe audience (U) for each demographic, $(U_k)$). Reference number 706 identifies third-party subscriber data, including subscriber data for audience size $(A_k)$ and duration $(D_k)$. Reference number 708 identifies census-level data, including census-level unique audience $(X_k)$ and census-level duration $(V_k)$. Reference number 710 identifies the total counts for each data group, including total universe audience (U), third-party total audience size (A), third-party total duration (D), census-level total audience size (X), and census-level total duration (V).

FIG. 7B shows a table 720 with an example set of data available from third-party subscriber data 122 of FIG. 1 and an example set of data available for census-level total duration 134 of FIG. 1. For example, a total of four different demographics (k) (reference number 722) are considered (e.g., population that is younger than 18 years of age, population between 18-34 years of age, population between 35-44 years of age, and population 55 years of age and older). The population 724 (e.g., universe audience, $U_k$) for each demographic (e.g., k=1-4) ranges from a total of 1,000 to a total of 10,000. Third-party subscriber data 726 includes audience size and duration values for each demographic, as well as values for total audience size and total durations. Census-level data 728 includes only total duration (e.g., 17,400), whereas demographic-specific unique audience size and duration, as well as the total unique audience size, are all variables to be solved for using the methods described throughout this application and applied in the examples below. For example, using data available from example table 720, the highest average duration among each demographic is for the 18-34 age range demographic (e.g., maximum of 3,600 minutes). As the census-level total audience size (X) is unconstrained, $c_1$ can be set equal to 1 (e.g., $c_1=1$) and $c_2$ can be solved to match census duration constraints. For example, the highest average duration per audience across demographics is $m^*=3,600/2,000=1.8$ (e.g., (e.g., $D_{18-34}/A_{18-34}=3,600/2,000=1.8$). Based on this calculation, Equation 36 can be used to further determine the search space (e.g., using the search space identifier 216). For example, the search space can be defined as $0 \leq c_2 \leq 0.555$, such that for each $c_2$ within such an interval, estimated census audience and durations can be determined to identify the $c_2$ where the total duration constraint is matched. Based on Equations 28 and 29, $s^{(1)}$ and $s^{(2)}$ variables can be determined and are equivalent to the z-variables defined for the panel:

$$s^{(1)}=\{0.833333, 0.138889, 1.250000, 0.277778\}$$

$$s^{(2)}=\{0.434598, 0.573753, 0.434598, 0.329193\}$$

Based on the calculated variables for $s^{(1)}$ and $s^{(2)}$, $c_2^*=0.234577$, and solutions to Equations 30-33 can be determined as follows:

$$f=\{1.67013, 3.11547, 1.67013, 1.14086\}$$

$$o=\{1.39177, 0.432705, 2.08766, 0.316905\}$$

$$p=\{0.5819, 0.302019, 0.67613, 0.240644\}$$

$$X=\{582\ 3,020\ 3,381\ 1,203\}$$

$$V=\{972\ 9,409\ 5,646\ 1,373\}$$

At the calculated $c_2^*$ value, the constraint $\Sigma V_k = V$, thereby providing a final estimate for the remaining values presented in table 720 for the determined census-level data 730. If all durations were to be scaled to a new unit, a different value for $c_2^*$ would be identified (e.g., scaled in an opposite direction), while the estimated census audience (e.g., census-level data 730) would remain the same and the estimated durations would scale by the same original factor.

FIG. 7C shows a table 740 with an example set of data 746 available from third-party subscriber data 122 of FIG. 1 and an example set of data 748 available for census-level total duration 134 of FIG. 1. In the example table 740 of FIG. 7C, the duration of the third-party subscriber data 746 has the same audience size data demographics 742, as well as the same population size 744, as that of table 720 of FIG. 7B. However, in the example of FIG. 7C, both the census-level total audience size (X) and census-level total duration (V) are given. Accordingly, both X and V are constrained, and a solution for both $c_1$ and $c_2$ is obtained. For example, a solution for $c_1$ and $c_2$ would satisfy both constraints, where $0 \leq c_1 < \infty$ and $-\infty \leq c_2 \leq 0.555$. Based on Equations 28 and 29, $s^{(1)}$ and $s^{(2)}$ variables can be determined and are equivalent to the z-variables defined for the panel:

$$s^{(1)}=\{0.833333, 0.138889, 1.250000, 0.277778\}$$

$$s^{(2)}=\{0.434598, 0.573753, 0.434598, 0.329193\}$$

Based on the calculated variables for $s^{(1)}$ and $s^{(2)}$, $\{c_1^*, c_2^*\}=\{4.51995, -0.0210377\}$, and solutions to Equations 30-33 can be determined as follows:

$$f=\{1.17045, 1.73432, 1.17045, 0.883276\}$$

$$o=\{4.40865, 1.08876, 6.61298, 1.10899\}$$

$$p=\{0.815111, 0.521247, 0.868645, 0.525839\}$$

$$X=\{815\ 5,212\ 4,343\ 2,629\}$$

$$V=\{954\ 9,040\ 5,084\ 2,322\}$$

At the calculated $c_1^*$ and $c_2^*$ value, the constraint $\Sigma X_k = X$ and $\Sigma T_k = T$, thereby providing a final estimate for the remaining values presented in table 740 for the determined census-level data 750. If all durations were to be scaled to a new unit, a different value for $c_2^*$ would be identified (e.g., scaled in an opposite direction) while $c_1^*$ would remain the same as before. Additionally, the estimated census level audience would remain the same and the estimated durations would sale by the same original factor.

Figure 8:
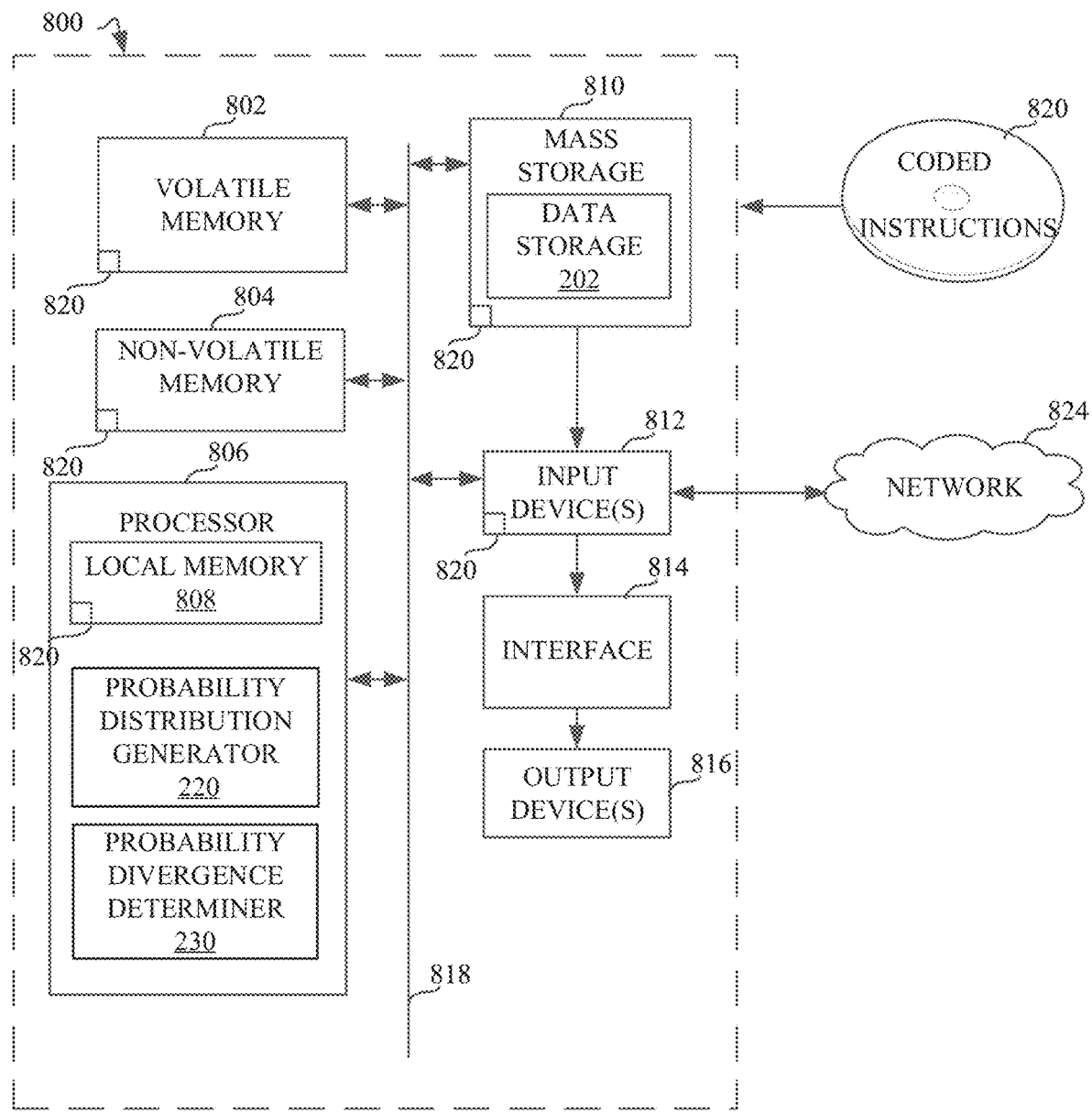
FIG. 8 is a block diagram of an example processing platform structured to execute the instructions of FIGS. 3-6 to implement the example audience metrics estimator of FIGS. 1-2.

FIG. 8 is a block diagram of an example processing platform structured to execute the instructions of FIGS. 3-6 to implement the example audience metrics estimator of FIGS. 1-2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 806. The processor 806 of the illustrated example is hardware. For example, the processor 806 can be implemented by one or more integrated circuits, logic circuits, microprocessors, GPUs, DSPs, or controllers from any desired family or manufacturer. The hardware processor 806 may be a semiconductor based (e.g., silicon based) device. In this example, the processor 806 implements the example probability distribution generator 220 and the example probability divergence determiner 230 of FIG. 2.

The processor 806 of the illustrated example includes a local memory 808 (e.g., a cache). The processor 806 of the illustrated example is in communication with a main memory including a volatile memory 802 and a non-volatile memory 804 via a bus 818. The volatile memory 802 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 804 may be implemented by flash memory and/or any other desired type of memory device. Access to the main memory 802, 804 is controlled by a memory controller.

The processor platform 800 of the illustrated example also includes an interface circuit 814. The interface circuit 814 may be implemented by any type of interface standard, such as an Ethernet interface, a universal serial bus (USB), a Bluetooth® interface, a near field communication (NFC) interface, and/or a PCI express interface.

In the illustrated example, one or more input devices 812 are connected to the interface circuit 814. The input device(s) 812 permit(s) a user to enter data and/or commands into the processor 806. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 816 are also connected to the interface circuit 814 of the illustrated example. The output devices 816 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 814 of the illustrated example, thus, typically includes a graphics driver card, a graphics driver chip and/or a graphics driver processor.

The interface circuit 814 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 824. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 810 for storing software and/or data. Examples of such mass storage devices 810 include floppy disk drives, hard drive disks, compact disk drives, Blu-ray disk drives, redundant array of independent disks (RAID) systems, and digital versatile disk (DVD) drives. The mass storage device 810 includes the example data storage 210 of FIG. 2.

Machine executable instructions 820 represented in FIGS. 3-6 may be stored in the mass storage device 820, in the volatile memory 802, in the non-volatile memory 804, and/or on a removable non-transitory computer readable storage medium such as a CD or DVD.

From the foregoing, it will be appreciated that example systems, methods, and apparatus allow for use of third-party subscriber-level audience metrics that provide partial information on duration and unique audience sizes to overcome the anonymity of census-level impressions when estimating total unique audience sizes for media. Examples disclosed herein apply information theory to derive a solution to parse census-level information into demographics-based data. In examples disclosed herein, a census-level audience metrics estimator determines census-level unique audience and/or durations across demographics by determining probabilities of an individual in a given demographic being a member of the third-party subscriber data for each of the audience size and durations, determining a probability divergence between the third-party subscriber data and census-level data, and establishing a search space within bounds based on one or more equality constraints. The examples disclosed herein permit estimations that are logically consistent with all constraints, scale independence and invariance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement system to determine census-level audience metrics across demographic categories for streaming media accessed via user devices, the audience measurement system comprising:
    an impression monitor system including a first processor and a communication interface, the impression monitor system to receive a first beacon request in a first network communication from a first one of the user devices when tagged media is accessed by the first one of the user devices, log media identification information corresponding to the first beacon request in an impression record, and return a beacon response message in a second network communication to the first one of the user devices, the beacon response message including a redirect message that is to instruct the first one of the user devices to send a second beacon request in a third network communication to a database proprietor; and
    a computing system including a second processor and a memory, the computing system to:
        receive, from the database proprietor, third-party aggregate subscriber-based audience metrics for the tagged media;
        determine census-level information for the tagged media based on the logged impression record corresponding to the tagged media accessed by the first one of the user devices and other logged impression records corresponding to the tagged media accessed by other ones of the user devices; and
        estimate a census-level unique audience size and a census-level impression duration for a demographic category for the tagged media using the census-level information and the third-party subscriber-based audience metrics by:
            initializing distribution parameter values for an individual-specific probability distribution based on the third-party aggregate subscriber-based audience metrics and the census-level information, wherein the individual-specific probability distribution defines a probability of an individual within the demographic category (i) being included in an audience of the tagged media subject to a set of constraints specifying that: (i) the individual within a subscriber audience for the demographic category and (ii) the individual having a first impression duration, the subscriber audience for the demographic category having a first subscriber audience size and a first subscriber total duration;
            based on the initialized distribution parameter values, solving a set of equations to thereby compute a final individual-specific probability distribution defined by distribution parameters $z_0$, $z_1$, $z_2$, and $z_3$ corresponding to the distribution parameter values for the individual-specific probability distribution subject to the set of constraints, wherein the set of equations includes:

$$z_0 = 1 - d_1$$

$$z_1 = \frac{d_1^2}{(1 - d_1)d_2}$$

$$z_2 = e^{-\frac{d_1}{d_2}}$$

in which: (i) $d_1$ corresponds to the first subscriber audience size normalized by a total population of the demographic category, and (ii) $d_2$ corresponds to the first subscriber total duration normalized by the total population of the demographic category;
            determining divergence parameter values between respective parameters of individual-specific probability distributions across all demographic categories, the divergence parameter values determined based on (i) parameters of a prior distribution solved for based on the third-party aggregate subscriber-based audience metrics and (ii) parameters of a posterior distribution solved for based on the census-level information;

identifying a search space within bounds, the bounds based on a census-level total impression count and a census-level total impression duration associated with the census-level information, the search space defining a range based on a census-level duration equality constraint and a census-level audience equality constraint, an upper limit of the range determined based on a ratio of a third-party subscriber audience size to a third-party duration;

iterating over the search space until census-level outputs based on the divergence parameter values satisfy the census-level duration equality constraint and the census-level audience equality constraint, the census-level outputs including the census-level unique audience size and the census-level impression duration for the demographic category; and outputting the census-level unique audience size and the census-level impression duration for the demographic category correct for anonymity of the third-party aggregate subscriber-based audience metrics.

2. The audience measurement system of claim 1, further including a database to:

store, from the database proprietor, subscriber data including the first subscriber audience size and the first impression duration for the demographic category;

access, from the first one of the user devices, a user-based impression duration; and store census-level data including the census-level unique audience size and the census-Level impression duration.

3. The audience measurement system of claim 2, wherein the census-level audience metrics are media audience metrics, the media including at least one of a webpage, an advertisement, or a video.

4. The audience measurement system of claim 2, wherein the census-level data includes data logged by an audience measurement entity.

5. The audience measurement system of claim 2, wherein the census-level audience equality constraint is valid for the census-level audience metrics across a plurality of demographic categories represented in the third-party aggregate subscriber-based audience metrics.

6. The audience measurement system of claim 1, wherein the first subscriber audience size is provided by the database proprietor.

7. The audience measurement system of claim 1, wherein the census-level duration equality constraint constrains a summation across all demographic categories of respective unique census-level impression durations for corresponding ones of the demographic categories to correspond to the census-level total impression duration.

8. A method to determine census-level audience metrics across demographic categories for streaming media accessed via user devices, the method comprising:

receiving a first beacon request in a first network communication from a user device when tagged media is accessed by the user device;

logging an impression record by recording media identification information corresponding to the first beacon request;

returning a beacon response message in a second network communication to the user device, wherein the beacon response message comprises a redirect message that instructs the user device to send a beacon request in a third network communication to a database proprietor;

receiving, from the database proprietor, third-party aggregate subscriber-based audience metrics for the tagged media;

determining, by executing an instruction with at least one processor, census-level information for the tagged media based on a logged impression record corresponding to the tagged media accessed by the user device and other logged impression records corresponding to the tagged media accessed by other user devices; and estimating, by executing an instruction with the at least one processor, a census-level unique audience size and a census-level impression duration for a demographic category for the tagged media using the census-level information and the third-party subscriber-based audience metrics by:

initializing distribution parameter values for an individual-specific probability distribution based on the third-party aggregate subscriber-based audience metrics and the census-level information, wherein the individual-specific probability distribution defines a probability of an individual within the demographic category (i) being included in an audience of the tagged media subject to a set of constraints specifying that: (i) the individual is within a subscriber audience for the demographic category and (ii) the individual having a first impression duration, the subscriber audience for the demographic category having a first subscriber audience size and a first subscriber total duration;

based on the initialized distribution parameter values, solving a set of equations to thereby compute a final individual-specific probability distribution defined by distribution parameters $z_0$, $z_1$, $z_2$, and $z_3$ corresponding to the distribution parameter values for the individual-specific probability distribution subject to the set of constraints, wherein the set of equations includes:

$$z_0 = 1 - d_1$$

$$z_1 = \frac{d_1^2}{(1 - d_1)d_2}$$

$$z_2 = e^{-\frac{d_1}{d_2}}$$

in which: (i) $d_1$ corresponds to the first subscriber audience size normalized by a total population of the demographic category, and (ii) $d_2$ corresponds to the first subscriber total duration normalized by the total population of the demographic category;

determining divergence parameter values between respective parameters of individual probability distributions across all demographic categories, the divergence parameter values determined based on (i) parameters of a prior distribution solved for based on the third-party aggregate subscriber-based audience metrics in parameter of a posterior distribution solved for based on the census-level information;

identifying a search space within bounds, the bounds based on a census-level total impression count and a census-level total impression duration associated with the census-level information, the search space defining a range based on a census-level duration equality constraint and a census-level audience equality constraint, an upper limit of the range determined based on a ratio of a third-party subscriber audience size to a third-party duration;

iterating over the search space until census-level outputs based on the divergence parameter values satisfy the census-level duration equality constraint and the census-level audience equality constraint, the census-level outputs including the census-level unique audience size and the census-level impression duration for the demographic category; and outputting the census-level unique audience size and the census-level impression duration for the demographic category to correct for anonymity of the third-party aggregate subscriber-based audience metrics.

9. The method of claim 8, further including:

storing, from the database proprietor, subscriber data in a memory, the subscriber data including the first subscriber audience size and the first impression duration for the demographic category;

accessing, from the user device, a user-based impression duration; and storing census-level data in the memory, the census-level data including the census-level unique audience size and the census-level impression duration.

10. The method of claim 9, wherein the census-level audience metrics are media audience metrics, the media including at least one of a webpage, an advertisement, or a video.

11. The method of claim 9, wherein the census-level data includes data logged by an audience measurement entity.

12. The method of claim 9, wherein the census-level audience equality constraint is valid for the census-level audience metrics across a plurality of demographic categories represented in the third-party aggregate subscriber-based audience metrics.

13. The method of claim 8, wherein the first subscriber audience size is provided by the database proprietor.

14. The method of claim 8, wherein the census-level duration equality constraint constrains a summation across all demographic categories of respective unique census-level impression durations for corresponding ones of the demographic categories to correspond to the census-level total impression duration.

15. At least one non-transitory computer readable storage medium comprising instructions that, when executed, cause at least one processor to at least:

access a first beacon request in a first network communication from a user device when tagged media is accessed by the user device;

log an impression record by recording media identification information corresponding to the first beacon request;

return a beacon response message in a second network communication to the user device, wherein the beacon response message comprises a redirect message that instructs the user device to send a beacon request in a third network communication to a database proprietor;

access third-party aggregate subscriber-based audience metrics for the tagged media;

determine census-level information for the tagged media based on a logged impression record corresponding to the tagged media accessed by the user device and other logged impression records corresponding to the tagged media accessed by other user devices; and estimate a census-level unique audience size and a census-level impression duration for a demographic category for the tagged media using the census-level information and the third-party subscriber-based audience metrics by:

initializing distribution parameter values for an individual-specific probability distribution based on the third-party aggregate subscriber-based audience metrics and the census-level information, wherein the individual-specific probability distribution defines a probability of an individual within the demographic category (i) being included in an audience of tagged media subject to a set of constraints specifying that: (i) the individual is within a subscriber audience for the demographic category and (ii) the individual having a first impression duration, the subscriber audience for the demographic category having a first subscriber audience size and a first subscriber total duration;

based on the initialized distribution values, solving a set of equations to thereby compute a final individual-specific probability distribution defined by distribution parameters $z_0$, $z_1$, $z_2$, and $z_3$ corresponding to the distribution parameter values for the individual-specific probability distribution subject to the set of constraints, wherein the set of equations includes, $$z_0 = 1 - d_1$$

$$z_1 = \frac{d_1^2}{(1-d_1)d_2}$$

$$z_2 = e^{-\frac{d_1}{d_2}}$$

in which: (i) $d_1$ corresponds to the first subscriber audience size normalized by a total population of the demographic category, and (ii) $d_2$ corresponds to the first subscriber total duration normalized by the total population of the demographic category;

determining divergence parameter values between respective parameters of individual-specific probability distribution across all demographic categories, the divergence parameter values determined based on (i) parameters of a prior distribution solved for based on the third-party aggregate subscriber-based audience metrics and (ii) parameters of posterior distribution solved for based on the census-level information;

identifying a search space within bounds, the bounds based on a census-level total impression count and a census-level total impression duration associated with the census-level information, the search space defining a range based on a census-level duration equality constraint and a census-level audience equality constraint, an upper limit of the range determined based on a ratio of a third-party subscriber audience size to a third-party duration;

iterating over the search space until census-level outputs based on the divergence parameter values satisfy the census-level duration equality constraint and the census-level audience equality constraint, the census-level outputs including the census-level unique audience size and the census-level impression duration for the demographic category; and outputting the census-level audience size and the census-level impression duration for the demographic category to correct for anonymity of the third-party aggregate subscriber-based audience metrics.

16. The at least one non-transitory computer readable storage medium of claim 15, wherein the instructions cause the at least one processor to:
store, from the database proprietor, subscriber data including the first subscriber audience size and the first impression duration for the demographic category;
access, from the user device, a user-based impression duration; and
store census-level data including the census-level unique audience size and the census-level impression duration.

17. The at least one non-transitory computer readable storage medium of claim 16, wherein the instructions cause the at least one processor to verify the census-level audience equality constraint is valid for census-level audience metrics across a plurality of demographic categories represented in the third-party aggregate subscriber-based audience metrics.

18. The at least one non-transitory computer readable storage medium of claim 16, wherein the instructions cause the at least one processor to retrieve census-level data, the census-level data including data logged by an audience measurement entity.

19. The at least one non-transitory computer readable storage medium of claim 15, wherein the instructions cause the at least one processor to retrieve the first subscriber audience size from the database proprietor.

20. The at least one non-transitory computer readable storage medium of claim 15, wherein the census-level duration equality constraint constrains a summation across all demographic categories of respective unique census-level impression durations for corresponding ones of the demographic categories to correspond to the census-level total impression duration.

* * * * *